US012477644B2

(12) United States Patent
Zeng et al.

(10) Patent No.: US 12,477,644 B2
(45) Date of Patent: Nov. 18, 2025

(54) SEGMENTATION METHOD, DEVICE, LAMP, AND COMPUTER-READABLE STORAGE MEDIUM

(71) Applicant: Shenzhen Intellirocks Tech. Co., Ltd., Shenzhen (CN)

(72) Inventors: Jiabao Zeng, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/896,040

(22) Filed: Sep. 25, 2024

(65) Prior Publication Data
US 2025/0120002 A1  Apr. 10, 2025

(30) Foreign Application Priority Data
Oct. 10, 2023  (CN) .......................... 202311307201.1

(51) Int. Cl.
*H05B 47/175*  (2020.01)
*G06F 3/04847*  (2022.01)

(52) U.S. Cl.
CPC ....... *H05B 47/196* (2024.01); *G06F 3/04847* (2013.01)

(58) Field of Classification Search
CPC .......................... H05B 47/196; G06F 3/04847
See application file for complete search history.

(56) References Cited

U.S. PATENT DOCUMENTS

| 2012/0242254 | A1* | 9/2012 | Kim ..................... H05B 47/198 315/312 |
| 2019/0342983 | A1* | 11/2019 | Meerbeek ............ H05B 47/105 |
| 2020/0184927 | A1* | 6/2020 | Jung ...................... A63F 13/28 |

(Continued)

FOREIGN PATENT DOCUMENTS

| CN | 114051304 A | 2/2022 | |
| EP | 4162772 B1 * | 2/2024 | ........... H05B 47/196 |
| EP | 4136939 B1 * | 7/2024 | ........... H05B 47/155 |

OTHER PUBLICATIONS

Screen Capture from YouTube video clip entitled "How to Use the Govee App (Detailed Video)" uploaded on Aug. 16, 2023 by user "JB's DIY TV". Retrieved from Internet: <https://www.youtube.com/watch?v=KWp5gKOOZwU> (Year: 2023).*

*Primary Examiner* — Raymond R Chai
(74) *Attorney, Agent, or Firm* — Wenye Tan

(57) ABSTRACT

A segmentation method includes displaying a setting interface for segment setting, the setting interface including a plurality of segment areas, the plurality of segment areas including a plurality of lighting areas, and the plurality of lighting areas one-to-one corresponding to a plurality of light-emitting units included in a lamp. The method also includes: in response to a user's modification operation on the plurality of segment areas, displaying a modified segment area, the modification operation being an operation by a user to modify the number of the segment areas and/or the number of lighting areas included in a segment area; in response to a user's save operation on the modified segment area, saving the modified segment area; and sending segmentation information of the modified segment area to the lamp, for the lamp to control the plurality of light-emitting units to display corresponding lighting effect.

14 Claims, 17 Drawing Sheets

(56) References Cited

U.S. PATENT DOCUMENTS

| | | | |
|---|---|---|---|
| 2023/0146188 A1* | 5/2023 | Van Den Broek ... | H05B 47/155 |
| | | | 315/130 |
| 2023/0262863 A1* | 8/2023 | Aliakseyeu .......... | H05B 47/165 |
| | | | 315/294 |
| 2024/0090104 A1* | 3/2024 | Squillace ............. | H05B 47/155 |

* cited by examiner

SEGMENTATION METHOD, DEVICE, LAMP, AND COMPUTER-READABLE STORAGE MEDIUM

CROSS-REFERENCES TO RELATED APPLICATIONS

This application claims priority to Chinese Patent Application No. CN2023113072011, filed on Oct. 10, 2023, the content of which is hereby incorporated by reference in entirety.

FIELD OF THE TECHNOLOGY

The present disclosure relates to the technical field of lighting technology and, specifically, to a segmentation method, device, lamp, and computer-readable storage medium.

BACKGROUND OF THE DISCLOSURE

Lamps are now essential equipment in our daily lives. In order to enable lamps to present lighting effects with multiple lighting parameters, lamps are generally composed of multiple light-emitting units. When manufacturers produce lamps, they segment the multiple light-emitting units in the lamps, thereby controlling the light-emitting units in segments to enable the lamps to present different lighting effects. Since the segmentation of the light-emitting units is determined by the manufacturer, users cannot customize the segmentation of the light-emitting units in the lamps after leaving the factory, resulting in low flexibility in segmenting the light-emitting units.

The disclosed methods and apparatus are directed to solve one or more problems set forth above and other problems.

SUMMARY

Embodiments of the present disclosure provides a segmentation method, device, lamp, and computer-readable storage medium, which can improve the flexibility of segmenting the light-emitting units.

According to one aspect of the present disclosure, a segmentation method is provided for a client terminal. The method includes displaying a setting interface for segment setting, the setting interface including a plurality of segment areas, the plurality of segment areas including a plurality of lighting areas, and the plurality of lighting areas one-to-one corresponding to a plurality of light-emitting units included in a lamp. The method also includes: in response to a user's modification operation on the plurality of segment areas, displaying a modified segment area, the modification operation being an operation by a user to modify the number of the plurality of segment areas and/or the number of lighting areas included in a segment area; in response to a user's save operation on the modified segment area, saving the modified segment area; and sending segmentation information of the modified segment area to the lamp, the segmentation information being used by the lamp to control the plurality of light-emitting units to display corresponding lighting effect.

According to another aspect of the present disclosure, a segmentation method is provided for a lamp. The lamp includes a plurality of light-emitting units, and the method includes: receiving a segment setting instruction from a client terminal; controlling the plurality of light-emitting units to output a first lighting parameter according to the segment setting instruction; receiving segmentation information of a modified segment area from the client terminal, the modified segment area is determined by the client terminal in response to a user's modification operation on a plurality of segment areas, the user's modification operation being the user's modification of the number of the plurality of segment areas and/or the number of lighting areas included in a certain segment area; and controlling the plurality of light-emitting units to display corresponding lighting effect according to the segmentation information.

According to another aspect of the present disclosure, a computer-readable storage medium is provided. The computer-readable storage medium stores a computer program which, when executed by one or more processors, is configured for implementing a segmentation method. The method includes displaying a setting interface for segment setting, the setting interface including a plurality of segment areas, the plurality of segment areas including a plurality of lighting areas, and the plurality of lighting areas one-to-one corresponding to a plurality of light-emitting units included in a lamp. The method also includes: in response to a user's modification operation on the plurality of segment areas, displaying a modified segment area, the modification operation being an operation by a user to modify the number of the plurality of segment areas and/or the number of lighting areas included in a segment area; in response to a user's save operation on the modified segment area, saving the modified segment area; and sending segmentation information of the modified segment area to the lamp, the segmentation information being used by the lamp to control the plurality of light-emitting units to display corresponding lighting effect.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

Figure 1:
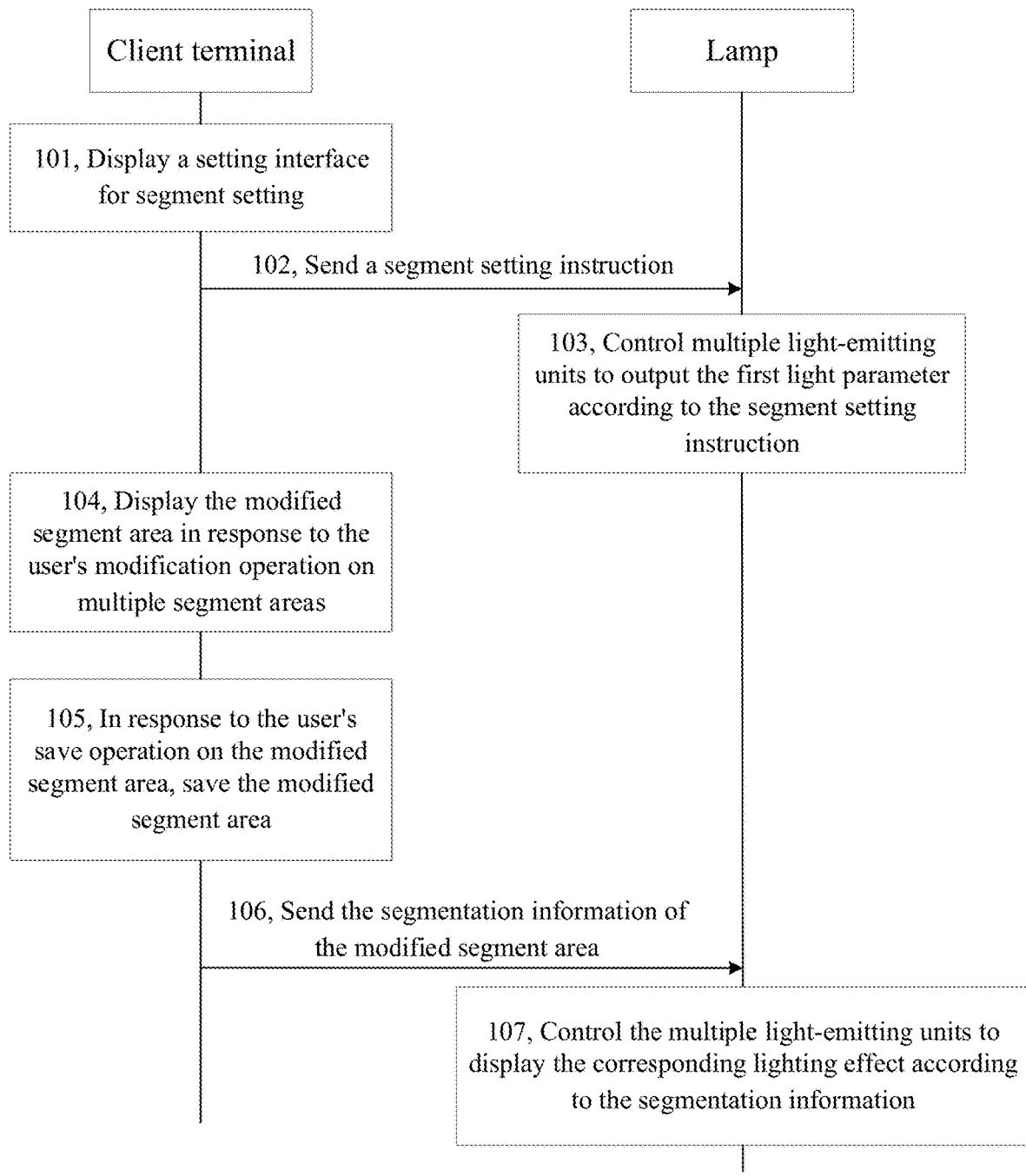
FIG. 1 illustrates a flow chart of a segmentation method according to an embodiment of the present disclosure.

The following describes exemplary embodiments in detail, and examples of the embodiments are shown in the accompanying drawings. Unless otherwise specified, a same number in different drawings may represent a same or similar element. the same or similar reference numerals throughout may represent same or similar elements. The embodiments described below with reference to the accompanying drawings are for examples and are only used to explain the present disclosure, not to limit the present disclosure.

In order to help those skilled in the art to better understand the present disclosure, the following describes technical solutions in the embodiment of the present disclosure in combination with the accompanying drawings. Apparently, the described embodiments are only some embodiments of the present disclosure, and not all of the embodiments. Based on the disclosed embodiments in the present disclosure, other embodiments obtained by those skilled in the art without creative work are within the scope of the present disclosure.

Lamps are now indispensable equipment in daily life. In order to enable lamps to present lighting effects with multiple lighting parameters, lamps are generally composed of multiple light-emitting units. When producing lamps, manufacturers segment the multiple light-emitting units in the lamps, thereby segmenting the light-emitting units to enable the lamps to present different lighting effects. Since the segmentation of the light-emitting unit is determined by the manufacturer, the user generally cannot customize the segmentation of the light-emitting unit in the lamp after leaving the factory, resulting in low flexibility in the segmentation of the light-emitting unit.

In order to solve the above problem and/or other related problems, in the embodiments of the present disclosure, a client terminal can first display a segmentation interface for segment setting. The client terminal, as used herein, may refer to a terminal device such as a smart phone or a computer together with applications (Apps) to perform various functions of the present disclosure, or the client terminal may also refer to a software application program running on a user device to perform various functions of the present disclosure. The segmentation interface can include multiple segment areas, the multiple segment areas include multiple lighting areas, and the multiple lighting areas one-to-one correspond to the multiple light-emitting units included in the lamp. Further, in response to the user's modification operation on the multiple segment areas, the modified segment area can be displayed, and finally the segmentation information of the modified segment area can be sent to the lamp, and the segmentation information is used by the lamp to control the multiple light-emitting units to display the corresponding lighting effect. Thus, the user can customize the grouping of the light-emitting units included in the lamp through the client terminal to achieve different lighting effects, thereby improving the flexibility of the segmentation of the light-emitting units.

FIG. 1 illustrates a flow chart of a segmentation method according to an embodiment of the present disclosure. As shown in FIG. 1, the segmentation method may include the following steps.

101. The client terminal displays a setting interface for segment setting.

After a user selects to set segments of a lamp, the client terminal can display a setting interface for setting segments of the lamp. The setting interface may include multiple segment areas, and the multiple segment areas may include multiple lighting areas, and the multiple lighting areas one-to-one correspond to the multiple light-emitting units included in the lamp. Further, the segment area represents the individual area obtained after segmenting the light-emitting units included in the lamp into segments, and the lighting area represents the individual light-emitting unit included in each segment area in the lamp, and the light-emitting unit may include one or more lamp beads.

The number of segment areas can be set according to actual needs. The number of segment areas can be less than or equal to 24. For example, the number of segment areas can be 1, 5, 10, or any value less than or equal to 24. A segment area can include multiple lighting areas. For example, a segment area can include 4 lighting areas, 5 lighting areas, 6 lighting areas, or any number of lighting areas. The number of lighting areas included in a segment area can be set according to actual needs, and can be set by the user or by the manufacturer.

As an implementation, when the user sets segments of the lamp for the first time, the client terminal can display the default multiple segment areas of the lamp. For example, the number of segment areas corresponding to the lamp can be 24, and each segment area can include 5 lighting areas.

As another implementation, when the user sets segments of the lamp again, the client terminal can display historical multiple segment areas of the lamp, and the historical multiple segment areas can be multiple segment areas saved after the user's last modification.

Figure 2:
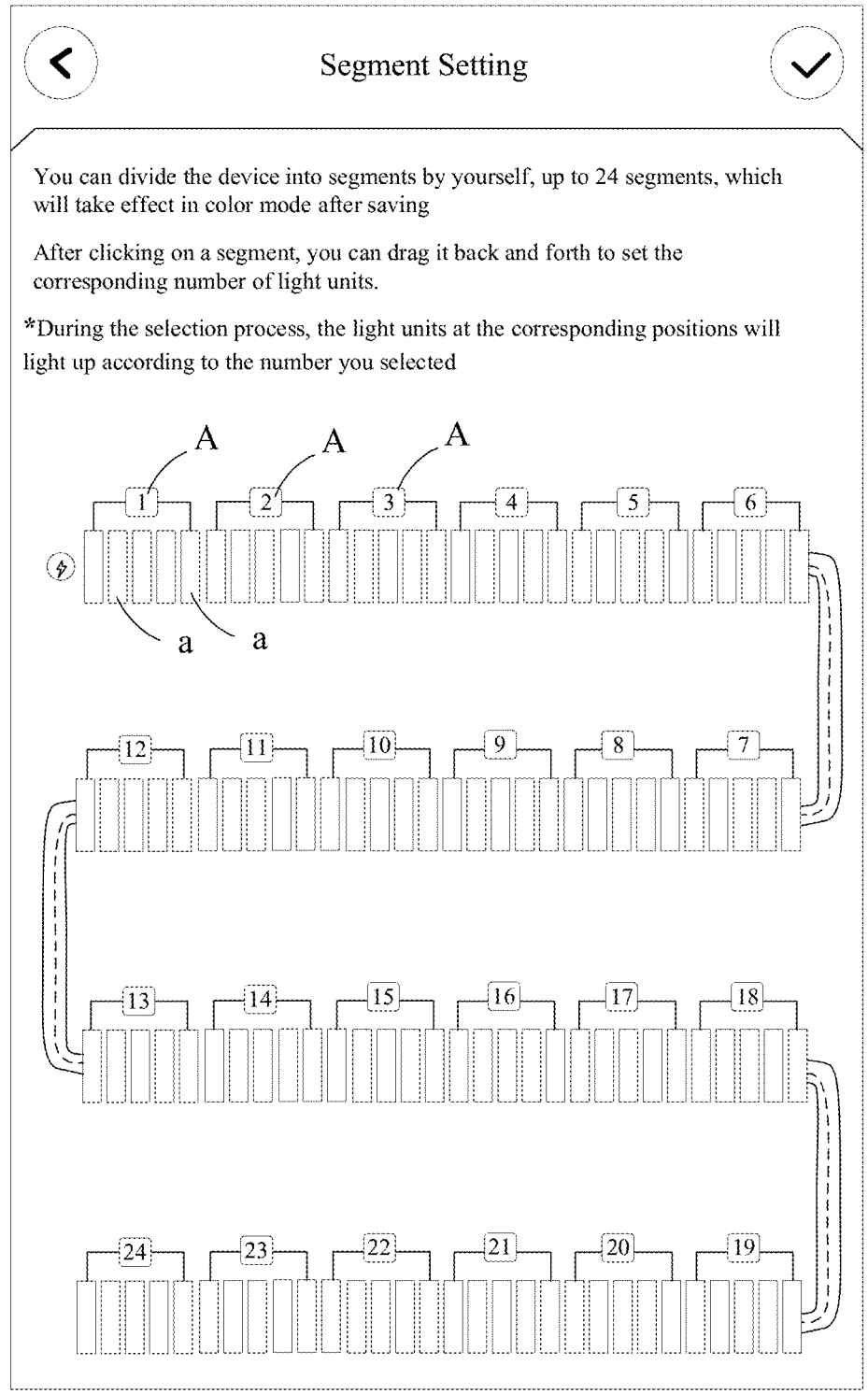
FIG. 2 illustrates a schematic diagram of an interface of a client terminal according to an embodiment of the present disclosure.

FIG. 2 illustrates a schematic diagram of the interface of a client terminal according to an embodiment of the present disclosure. As shown in FIG. 2, the segment setting interface can display 24 segment areas included in the lamp and there are 5 lighting areas included in each segment area, where 'A' is the segment area and 'a' is the lighting area.

As an implementation, the client terminal can determine the number of light-emitting units included in the lamp in response to the user's setting operation for the number of segments. For example, Step 101 can include: displaying the setting interface for segment setting according to the number of light-emitting units.

Before performing segment setting operation, the user can first select the number of segments that need to be segmented. The client terminal can determine the number of light-emitting units in response to the user's setting operation for the segment number setting, and then can display the setting interface for segment setting according to the number of light-emitting units. The number of light-emitting units included in each segment can be pre-set. It can also be set by the manufacturer or by the user. For example, the number of light-emitting units included in each segment can be 10, 15, 20, or other numbers. For example, when the number of light-emitting units included in each segment is 10, and the user selects 3 segments that need to be segmented, the client terminal can determine that the number of light-emitting units included in the lamp is 10*3=30. When the number of lighting areas included in a segment area is 5, the client terminal can display 6 segment areas included in the lamp when the number of light-emitting units is 30, and each segment area includes 5 lighting areas.

As shown in FIG. 2, the setting interface may prompt the user that the user can divide the device into segments, up to 24 segments, which will take effect in the color mode after the setting is saved. Further, on how to set the segmentation, the setting interface may prompt that, after clicking on a segment, the user can drag it back and forth to set the corresponding number of lighting units. During the selection process, the lights at the corresponding positions may light up according to the number the user selected.

Figure 3:
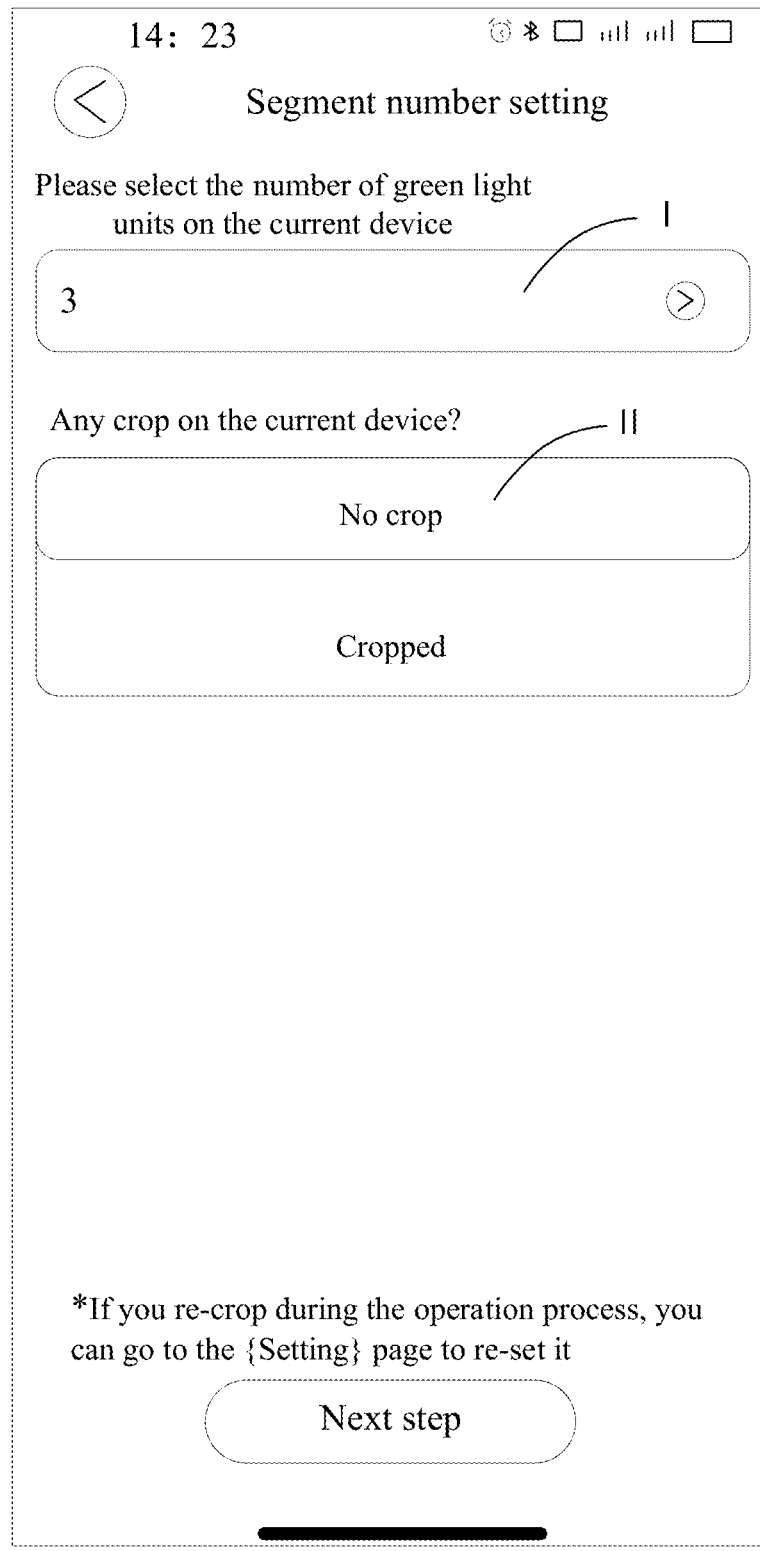
FIG. 3 illustrates a schematic diagram of another interface of a client terminal according to an embodiment of the present disclosure.

FIG. 3 illustrates a schematic diagram of the interface of another client terminal according to an embodiment of the present disclosure. As shown in FIG. 3, the segment number setting interface may include a segment number selection control and a crop selection control, where 'I' is a segment number selection control and 'II' is a crop selection control. The segment number selection control is used to determine the number of segments selected by the user, and the crop selection control is used to determine whether the user has cropped the lamp. For example, when the user sets the number of segments of the lamp, the client terminal may send a segment number setting instruction to the lamp. After receiving the segment number setting instruction, the lamp may control the first light-emitting unit of each segment in the number of segments included in the lamp to display green. The user may select the number of light-emitting units that display green through the segment number selection control. If the user has not cropped the lamp, the client terminal may determine the number of light-emitting units included in the lamp according to the number of green light-emitting units selected by the user and the number of light-emitting units included in each segment.

102. The client terminal sends a segment setting instruction to the lamp.

While the client terminal displays a segmentation interface for segment setting, the client terminal may also send a segment setting instruction to the lamp, which may be used for the lamp to control multiple light-emitting units to output a first lighting parameter(s). A lighting parameter may include one or more parameters for the lamp to present certain effect. For example, after the lamp receives the segment setting instruction, the lamp can control multiple light-emitting units to output cold white, warm white, red, or other lighting parameters, and the first lighting parameter is not limited here.

Step 102 can be executed synchronously with step 101.

103. The lamp controls multiple light-emitting units to output the first lighting parameter according to the segment setting instruction.

After receiving the segment setting instruction from the client terminal, the lamp can control multiple light-emitting units to output the first lighting parameter according to the segment setting instruction. The lighting parameter may include one or more parameters such as the color of the light, the brightness of the light, and/or the color temperature of the light.

104. The client terminal displays the modified segment area in response to the user's modification operation on multiple segment areas.

After the user modifies the multiple segment areas, the client terminal can display the modified segment area(s). The user's modification operation on multiple segment areas refers to the user's modification of the number of multiple segment areas and/or the number of lighting areas included in a certain segment area. For example, the user can delete a certain segment area, modify the number of lighting areas included in a certain segment area, or delete a segment and modify the number of lighting areas included in another segment.

In an embodiment, the process of, in response to the user's modification operation on multiple segment areas, displaying the modified segment area may include: in response to the user's selection operation on the first segment area in the multiple segment areas, highlighting the first segment area; and in response to the user's processing operation on the first segment area, displaying the modified segment area.

When the user modifies multiple segment areas, the first segment area to be modified can be selected from the multiple segment areas, and then the client terminal can highlight the first segment area. The user can process the first segment area, and then the client terminal can respond to the processing operation and display the modified segment area. Among them, the user's selection operation on the first segment area in multiple segment areas refers to the user selecting the first segment area from the multiple segment areas, and the first segment area can be any segment area in the multiple segment areas. Highlighting refers to displaying the multiple lighting areas included in the first segment area in one or more ways of different lighting parameters, different thicknesses, and different sizes, etc. The user's processing operation on the first segment area may include the user deleting the first segment area, and may also include the user modifying the number of lighting areas in the first segment area.

After the user selects the first segment area, the client terminal may send the area information of the first segment area to the lamp, and the lamp may control the light-emitting units corresponding to the first segment area to output a second lighting parameter according to the area information of the first segment area, and the second lighting parameter is different from the first lighting parameter. Among them, the area information of the first segment area may be information such as the number and positions of the light-emitting units corresponding to the first segment area.

Figure 4:
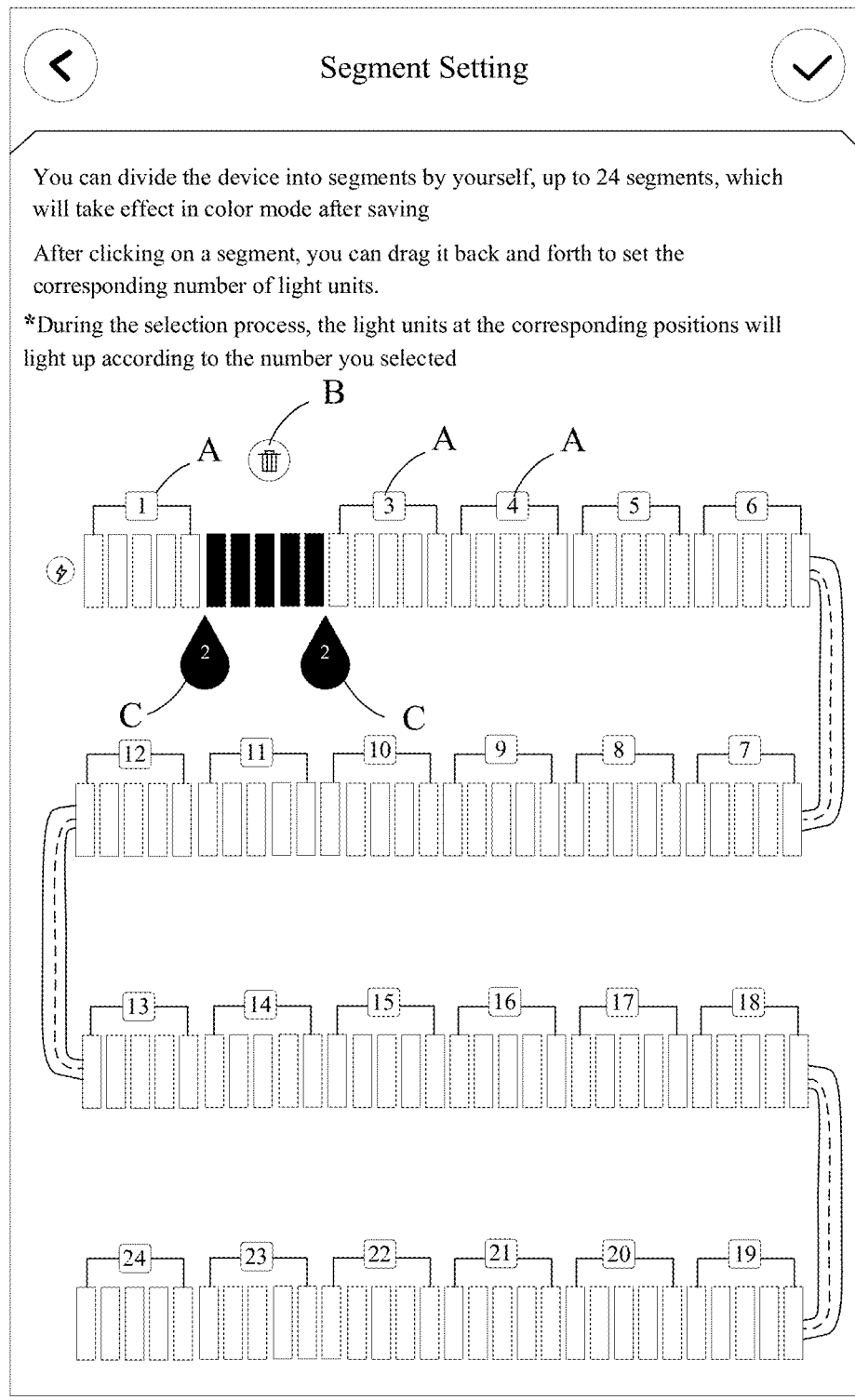
FIG. 4 illustrates a schematic diagram of another interface of a client terminal according to an embodiment of the present disclosure.

FIG. 4 illustrates a schematic diagram of another interface on the client terminal according to an embodiment of the present disclosure. As shown in FIG. 4, the segment setting interface can display 24 segment areas included in the lamp, and there are 5 lighting areas included in each segment area, 1 delete control, and 2 sliding controls, where 'B' is a delete control and 'C' is a sliding control. After the user selects the segment area with sequence number 2 as the first segment area, the interface can display the lighting area included in the first segment area with lighting parameters different from those of other lighting areas. For example, the user can modify the number of lighting areas in the segment area through two sliding controls, or delete the segment area through a deletion control.

As an implementation, when the user modifies the number of lighting areas in the first segment area through two sliding controls, the process of, in response to the user's processing operation on the first segment area, displaying the modified segment area may include: in response to the user's modification operation on the first segment area, determining the number of lighting areas included in the modified first segment area; and according to the number of lighting areas, determining the number of modified segment areas and the number of lighting areas included in a modified second segment area, so as to obtain the modified segment areas. The modified second segment area is adjacent to the modified first segment area, and the number of modified segment areas is less than or equal to the number of multiple segment areas.

When the user modifies the number of lighting areas in the first segment area through a sliding control, the client terminal may respond to the user's modification operation on the first segment area. The number of lighting areas in the modified first segment area may be determined first, so that the second segment area may be determined according to the number of lighting areas in the first segment area, and the number of lighting areas in the second segment area may be determined, and then the modified segment area(s) may be determined.

Further, the user's modification operation on the first segment area may refer to the user's operation of modifying the number of lighting areas in the first segment area. The second segment area refers to the segment area adjacent to the modified first segment area. The number of the second segment areas can be 1 or 2. For example, when the user manipulates only one of the two sliding controls to modify the number of lighting areas in the first segment area, the number of the second segment areas is 1. For example, when the user manipulates two sliding controls to modify the number of lighting areas in the first segment area, the number of the second segments is 2.

The number of segment areas after modification can be less than or equal to the number of segment areas before modification. After the user modifies the number of lighting areas in the first segment area, the number of segment areas included in the lamp can remain unchanged or decrease. For example, when the user manipulates the sliding control to reduce the number of lighting areas in the first segment area, the number of segment areas included in the lamp can remain unchanged. For example, when the user manipulates the sliding control to increase the number of lighting areas in the first segment area, the number of segment areas included in the lamp can remain unchanged or decrease.

For example, the user can manipulate the sliding control to slide across regions to increase the number of lighting areas in the first segment area.

Figure 5:
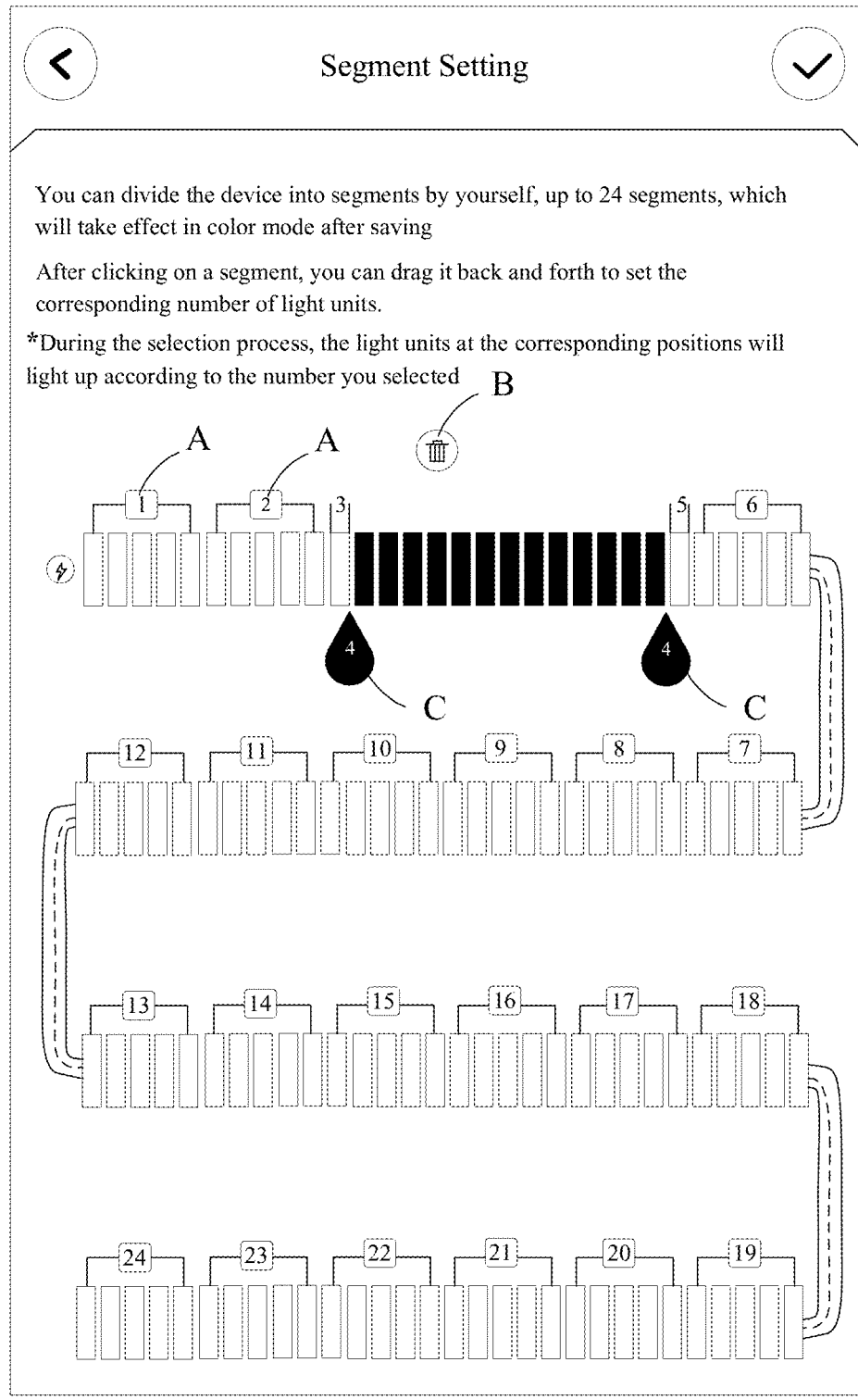
FIG. 5 illustrates a schematic diagram of another interface of a client terminal according to an embodiment of the present disclosure.

FIG. 5 illustrates a schematic diagram of another interface of a client terminal according to an embodiment of the present disclosure. As shown in FIG. 5, the segment setting interface can display 24 segment areas included in the lamp, and each segment area includes one or more lighting areas. Among them, the first segment area includes 13 lighting areas, and the two second segment areas (that is, the two segment areas with serial numbers 3 and 5 in the interface) and each includes 1 lighting area. In this case shown, the total number of segment areas remain the same at 24. In certain embodiments, when the user increases the number of lighting areas in the first segment area from 5 to 10 by manipulating the right sliding control of the two sliding controls, the number of segment areas included in the lamp can be reduced from 24 to 23.

Further, the user can also manipulate the sliding control to slide across segment rows to increase the number of lighting areas in the first segment area.

Figure 6:
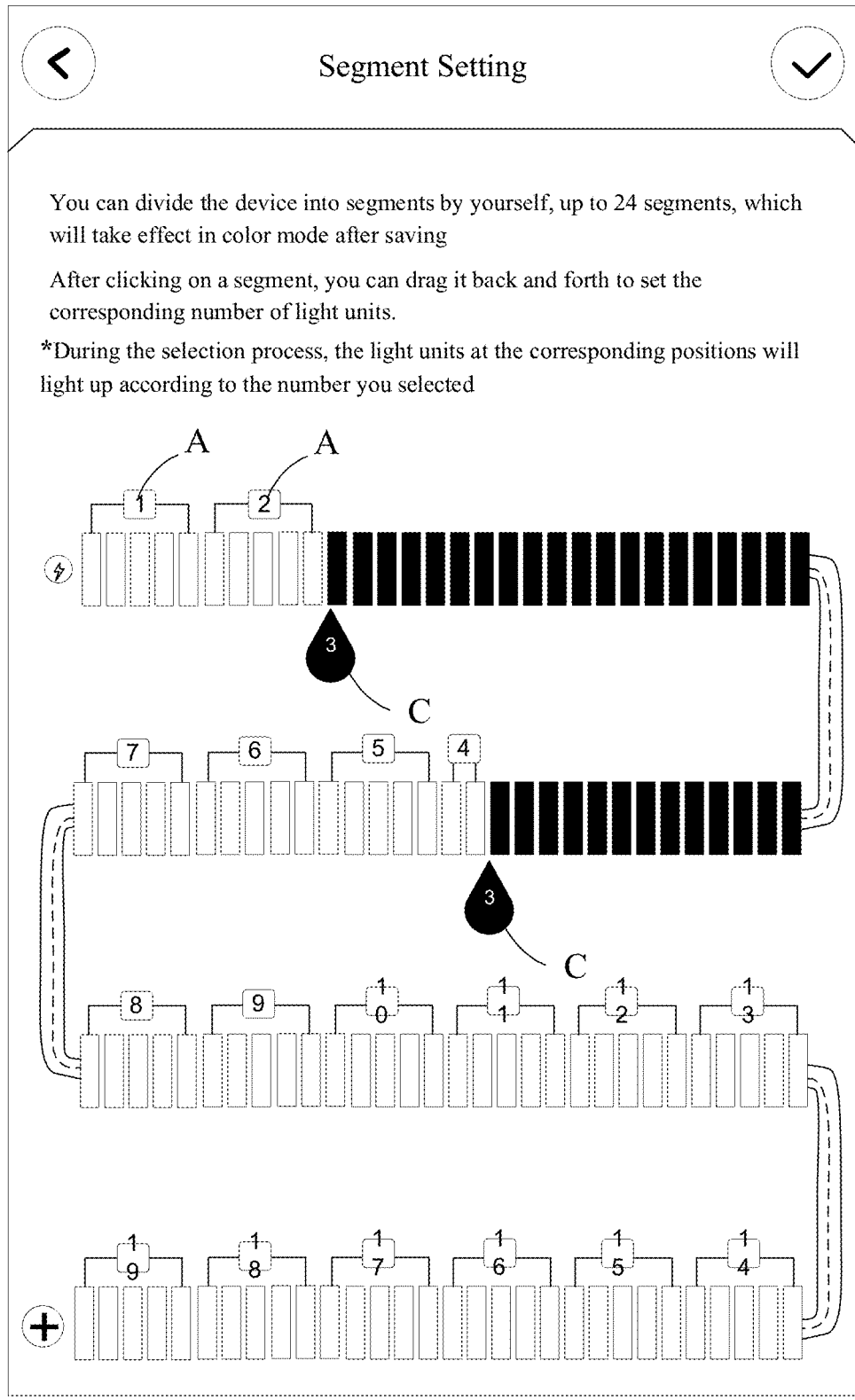
FIG. 6 illustrates a schematic diagram of another interface of a client terminal according to an embodiment of the present disclosure.

FIG. 6 illustrates a schematic diagram of another interface of a client terminal according to an embodiment of the present disclosure. As shown in FIG. 6, the segment setting interface can display 19 segment areas included in the lamp, and each segment area includes one or more lighting areas. Among them, the first segment area includes 33 lighting areas, and the second segment area (i.e., the segment area with a sequence number of 4 in the interface) includes 2 lighting areas. In this case, when the user increases the number of lighting areas in the first segment area from 5 to 33 by manipulating two sliding controls, the number of segment areas included in the lamp can be reduced from 24 to 19.

As an embodiment, in the case where the user deletes the first segment area through the deletion control, the process of, in response to the user's processing operation on the first segment area, displaying the modified segment area may include: in response to the user's deletion operation on the first segment area, merging the first segment area into a third segment area, and the third segment area is a segment area adjacent to the first segment area; and displaying the modified segment area.

When the user manipulates the deletion control 'B' to delete the first segment area, the client terminal can merge the first segment area into the third segment area in response to the user's deletion operation on the first segment area, where the third segment area is a segment area adjacent to the first segment area, and then display the modified segment area. The client terminal can determine the third segment area according to the position of the first segment area in the multiple segment areas. For example, when the first segment area is the last segment area in the multiple segment areas, the segment area ahead of the first segment area can be determined as the third segment area. For example, when the first segment area is not the last segment area in the multiple segment areas, the next segment area after the first segment area can be determined as the third segment area.

After determining the third segment area according to the position of the first segment area, the client terminal can merge the lighting areas in the first segment area into the third segment area to obtain the modified segment area. For example, when the first segment area is the last segment area in the multiple segment areas, the first segment area can be merged with the segment area ahead of the first segment area to obtain the modified segment area. For example, when the first segment area is not the last segment area among the multiple segment areas, the first segment area can be merged with the next segment area after the first segment area to obtain the modified segment area.

Figure 7:
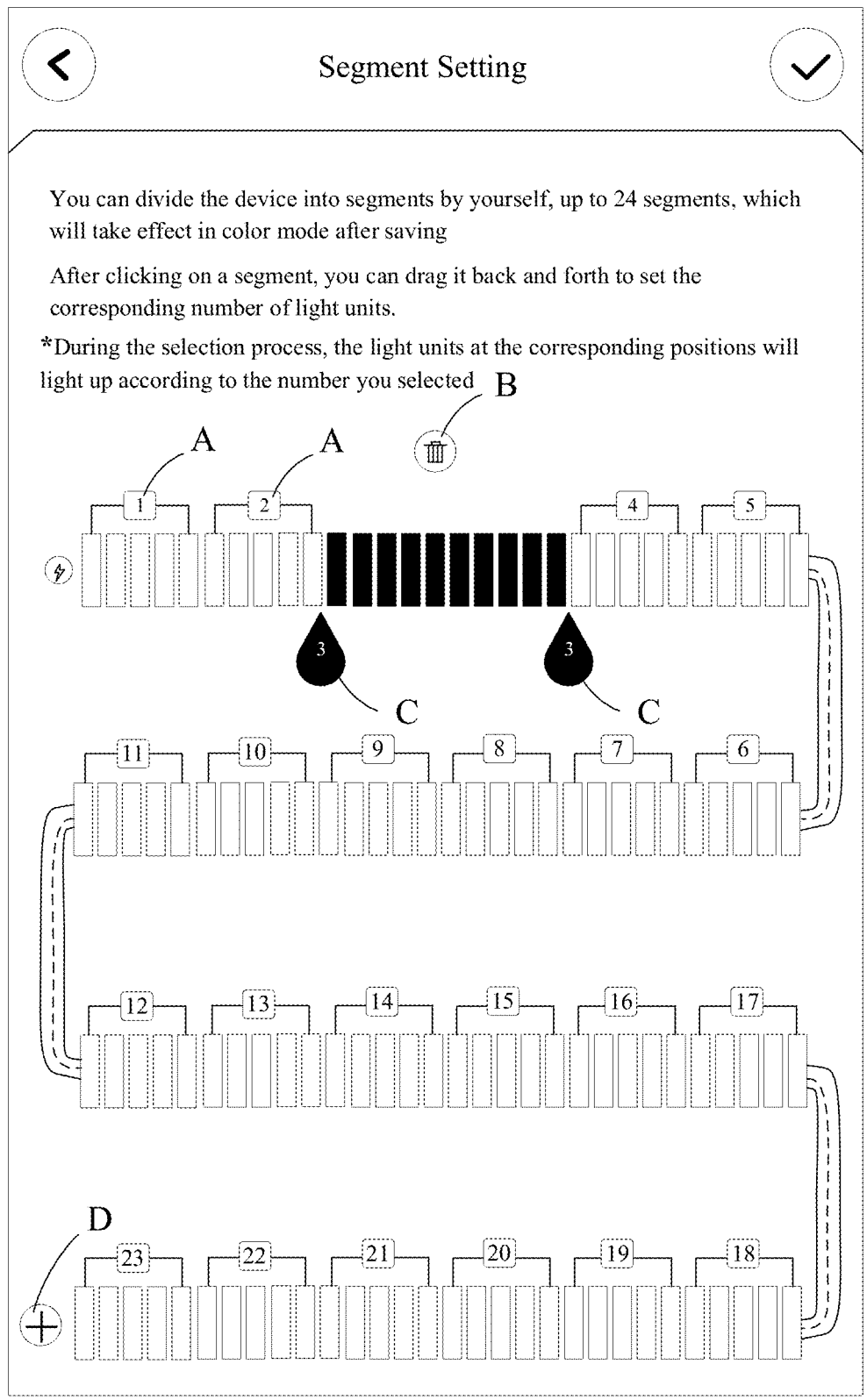
FIG. 7 illustrates a schematic diagram of another interface of a client terminal according to an embodiment of the present disclosure.

FIG. 7 illustrates a schematic diagram of another interface of a client terminal according to an embodiment of the present disclosure. As shown in FIG. 7, the segment setting interface can display 23 segment areas included in the lamp, and each segment area includes multiple lighting areas. Among them, the first segment area (i.e., the segment area with sequence number 3) includes 10 lighting areas. The deletion control 'B' can be used to delete the first segment area.

Figure 8:
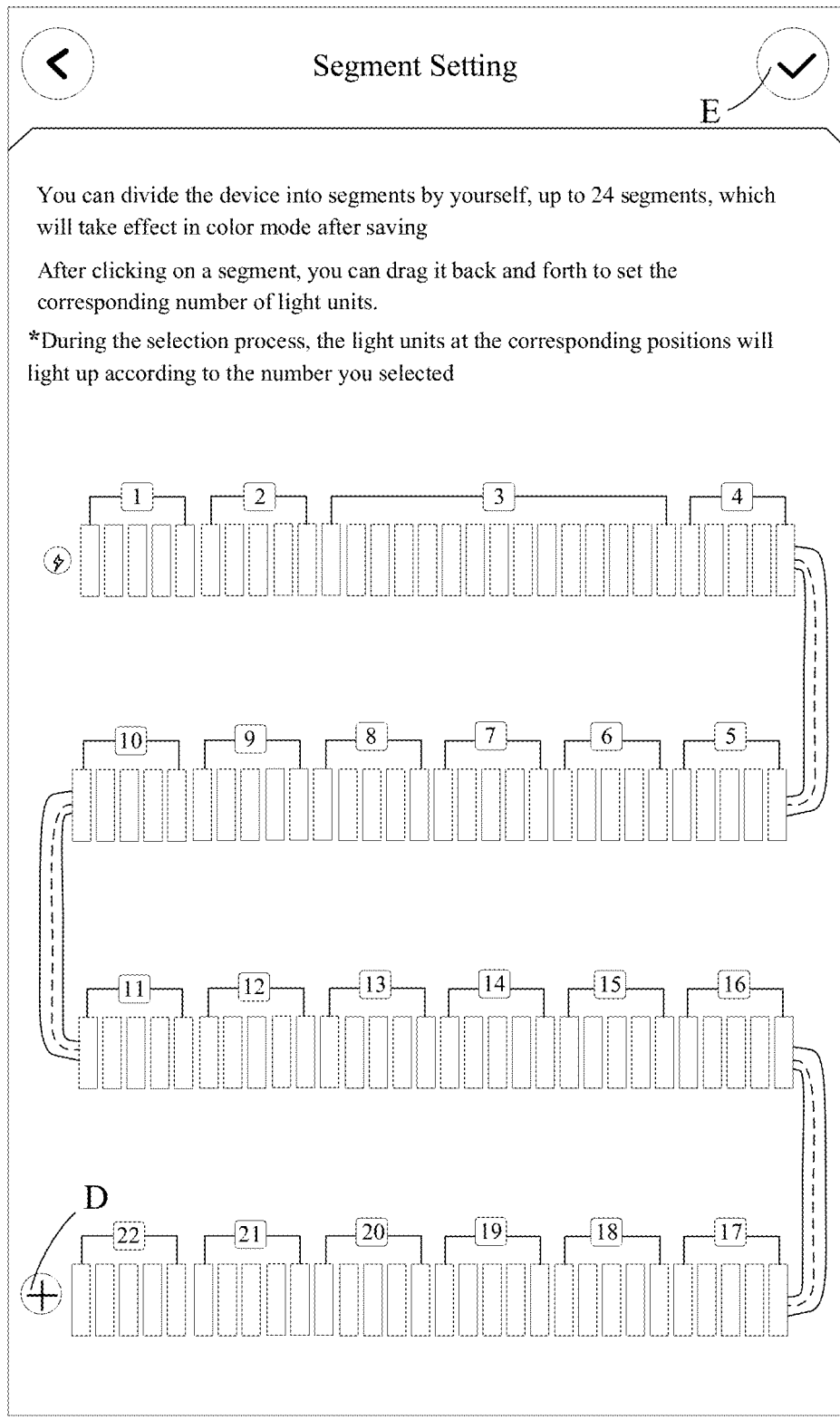
FIG. 8 illustrates a schematic diagram of another interface of a client terminal according to an embodiment of the present disclosure.

FIG. 8 illustrates a schematic diagram of another interface of a client terminal according to an embodiment of the present disclosure. After deleting the first segment area (i.e., the segment area with sequence number 3 in FIG. 7), the first segment area can be merged into the third segment area (i.e., the segment area with sequence number 4 in FIG. 7) to obtain a modified third segment area. As shown in FIG. 8, the modified third segment area includes 15 lighting areas, and the number of segment areas included in the lamp is reduced from 23 to 22.

As an implementation, the segment setting interface can also include an adding control. The process of, in response to the user's modification operation on the multiple segment areas, displaying the modified segment area may include: in response to the user's operation on the adding control, determining a fourth segment area, where the fourth segment area is a segment area with the number of lighting areas greater than or equal to 2; splitting the fourth segment area into two segment areas; and displaying the modified segment area.

After the user manipulates the adding control to add a segment area for the lamp, the client terminal may determine a fourth segment area in response to the user's operation on the adding control, where the fourth segment area is a segment area with the number of lighting areas greater than or equal to 2, then split the fourth segment area into two segment areas, and further display the modified segment area.

For example, when determining the fourth segment area, traversal may be started from the last segment area among the multiple segment areas included in the lamp, so that the first segment area with the number of lighting areas greater than or equal to 2 traversed is determined as the fourth segment area.

After determining the fourth segment area, a part of the lighting areas in the lighting areas included in the fourth segment area may be split into a new segment area to obtain a modified segment area. For example, the lighting areas in the fourth segment area can be evenly divided into the modified fourth segment area and a new segment area. If the number of lighting areas in the fourth segment area is an odd number, the remainder of the lighting areas obtained by the even division can be added to the new segment area.

As shown in FIG. 7, when the number of segment areas included in the lamp is less than 24 segments, the client terminal can display an adding control, where 'D' is an adding control. The user can add a new segment by manipulating the adding control 'D'. After the user manipulates the adding control, the client terminal can determine the segment area with a serial number of 23 as the fourth segment area, and then can add the last three lighting areas in the fourth segment area to the new segment area.

Figure 9:
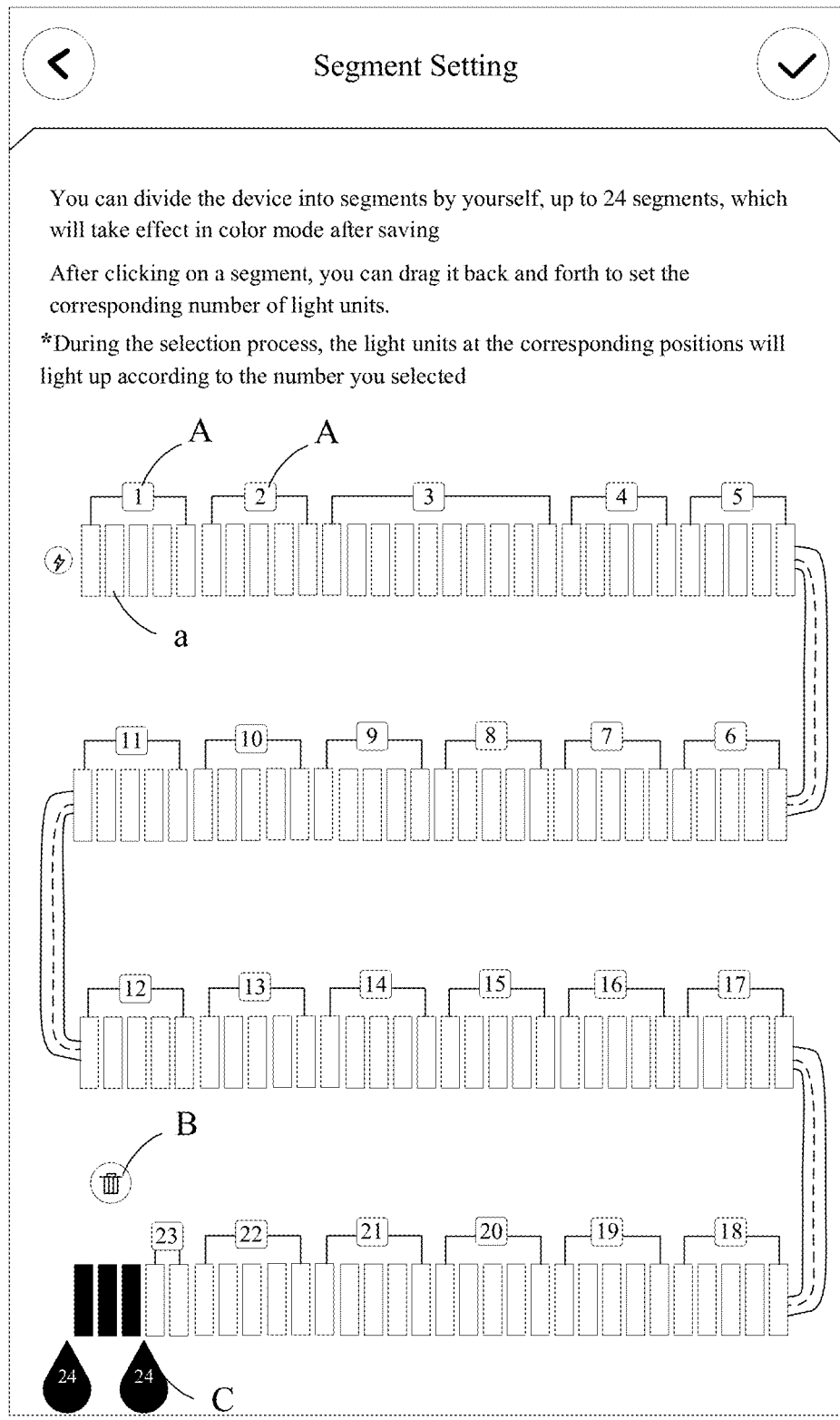
FIG. 9 illustrates a schematic diagram of another interface of a client terminal according to an embodiment of the present disclosure.

FIG. 9 illustrates a schematic diagram of another interface of a client terminal according to an embodiment of the present disclosure. As shown in FIG. 9, the lamp now includes 24 segment areas, wherein the number of lighting areas in the fourth segment area (i.e., the segment area with a serial number of 23 in the interface) is reduced to 2, and the number of lighting areas in the newly added segment area (i.e., the segment area with a serial number of 24 in the interface) is 3.

105. In response to the user's save operation on the modified segment area, save the modified segment area.

After the user modifies the multiple segment areas included in the lamp, the modified segment area(s) can be saved. The client terminal can save the modified segment area in response to the user's save operation.

Figure 10:
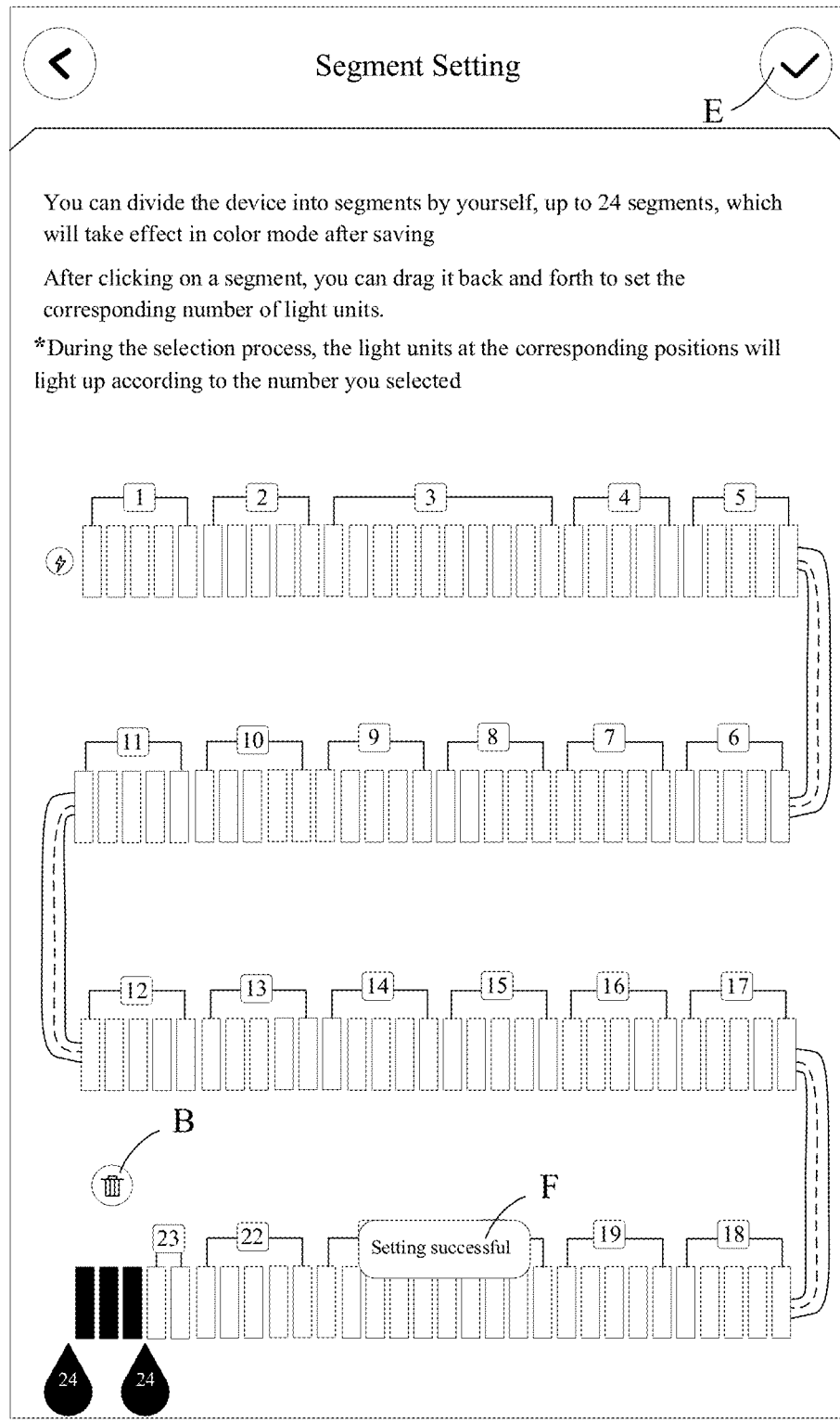
FIG. 10 illustrates a schematic diagram of another interface of a client terminal according to an embodiment of the present disclosure.

FIG. 10 illustrates a schematic diagram of another interface of a client terminal according to an embodiment of the present disclosure. As shown in FIG. 10, the segment setting interface can also include a save control, where 'E' is a save control. The user can manipulate the save control to save the modified segment area.

106. The client terminal sends the segmentation information of the modified segment area to the lamp.

After the user saves the modification of the multiple segment areas, the client terminal can send the segmentation information of the modified segment area to the lamp. The segmentation information can be used by the lamp to control the multiple light-emitting units in the lamp to display the corresponding lighting effect.

107. The lamp controls the multiple light-emitting units to display the corresponding lighting effect according to the segmentation information.

After receiving the segmentation information sent by the client terminal, the lamp can control the lighting parameters, brightness and other information of the light-emitting units included in the lamp according to the segmentation information, thereby displaying the corresponding lighting effect.

After the user completes the segment setting of the lamp, the lighting effect displayed by the lamp can be customized based on the segmentation information. For example, the user can customize the color, brightness, color temperature, etc., of the lighting effect of the lamp.

Figure 11:
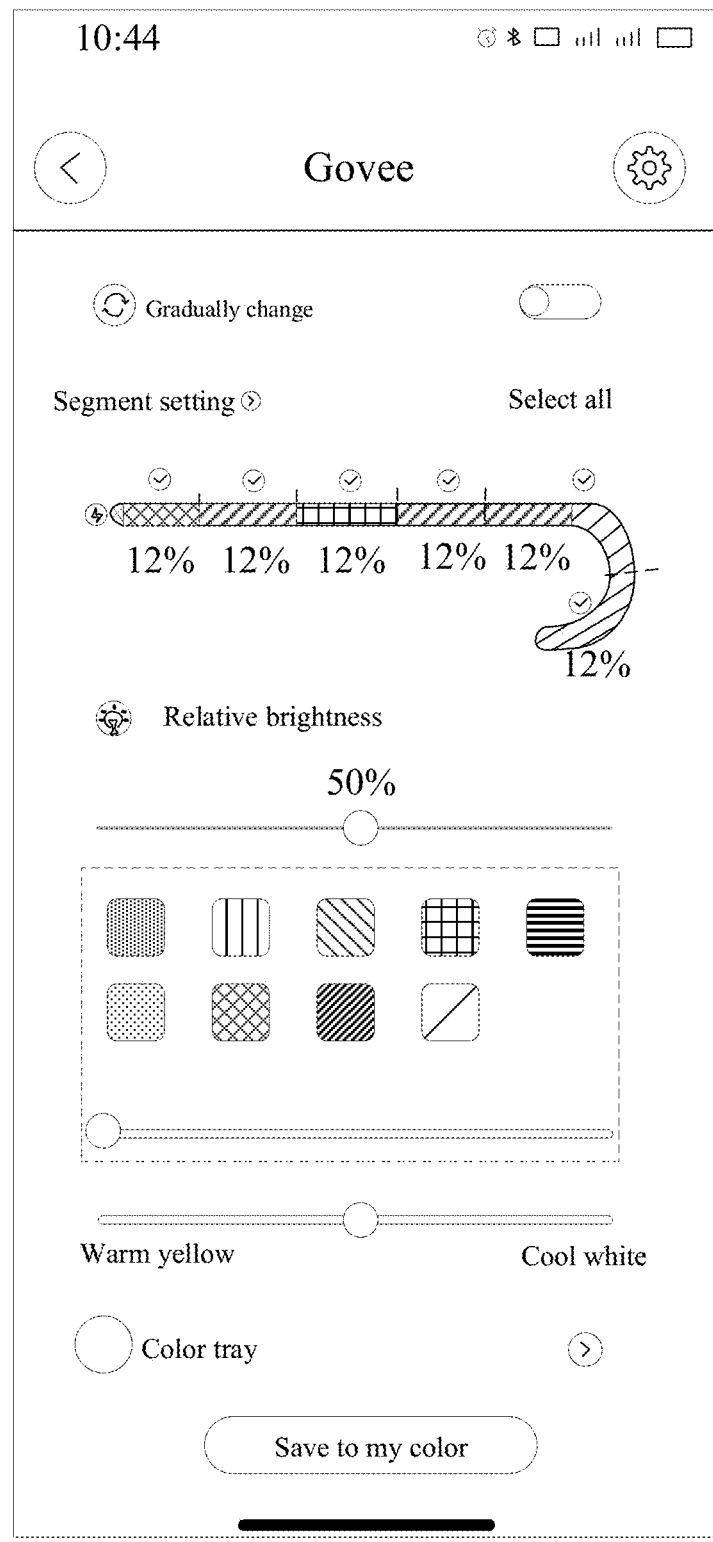
FIG. 11 illustrates a schematic diagram of another interface of a client terminal according to an embodiment of the present disclosure.

FIG. 11 illustrates a schematic diagram of another interface of a client terminal according to an embodiment of the present disclosure. As shown in FIG. 11, the user can customize the lighting effect included in the lamp through the interface.

Accordingly, in embodiments described in FIG. 1, the client terminal can first display the segmentation interface for segment setting, and the client terminal can also send a segment setting instruction to the lamp. After receiving the segment setting instruction, the lamp can control the multiple light-emitting units to output the first lighting parameters according to the segment setting instruction. The client terminal can display the modified segment area in response to the user's modification operation on the multiple segment areas, and the client terminal can save the modified segment area in response to the user's save operation on the modified segment area. Finally, the segmentation information of the modified segment area can be sent to the lamp. After receiving the segmentation information, the lamp can control the multiple light-emitting units to display the corresponding lighting effect according to the segmentation information. Therefore, the user can customize the grouping of the light-emitting units included in the lamp through the client terminal to achieve different lighting effects, thereby improving the flexibility of the light-emitting unit segmentation.

Figure 12:
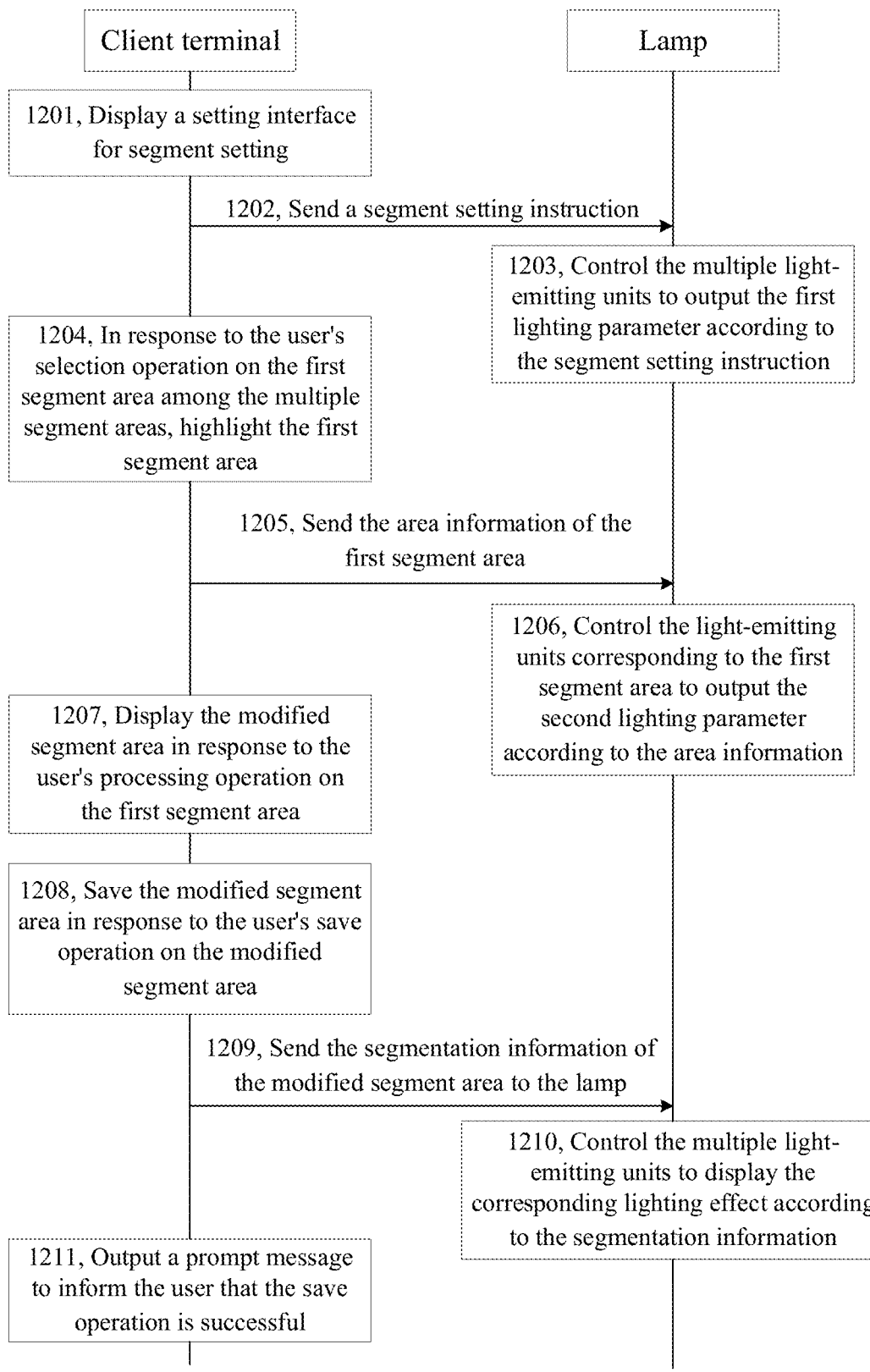
FIG. 12 illustrates a flow chart of another segmentation method according to an embodiment of the present disclosure.

FIG. 12 illustrates a flowchart of another segmentation method according to an embodiment of the present disclosure. As shown in FIG. 12, the segmentation method may include the following steps.

1201. The client terminal displays a setting interface for segment setting.

After the user chooses to segment the lamp, the client terminal may display a setting interface for segment setting of the lamp. The setting interface may include multiple segment areas, and the multiple segment areas may include multiple lighting areas, and the multiple lighting areas one-to-one correspond to the multiple light-emitting units included in the lamp. The segment area represents an individual piece of area obtained after segmenting the light-emitting units included in the lamp, and the lighting area represents a light-emitting unit included in each segment area in the lamp. The detailed description of step 1201 can refer to the description of step 101.

1202. The client terminal sends a segment setting instruction to the lamp.

While the client terminal displays the segmentation interface for segment setting, the client terminal can also send a segment setting instruction to the lamp, and the segment setting instruction can be used for the lamp to control the multiple light-emitting units in the lamp to output the first lighting parameter. For example, after the lamp receives the segment control instruction, it can control multiple light-emitting units to output cold white, warm white, red, or other lighting parameters, and the content of the first lighting parameter is not limited here. Further, step 1202 may be executed synchronously with step 1201.

1203. The lamp may control the multiple light-emitting units to output the first lighting parameter according to the segment setting instruction.

After receiving the segment setting instruction from the client terminal, the lamp may control the multiple light-emitting units in the lamp to output the first lighting parameter according to the segment setting instruction.

1204. In response to the user's selection operation on the first segment area among the multiple segment areas, the client terminal highlights the first segment area.

When the user modifies the multiple segment areas, the first segment area to be modified can be selected from the multiple segment areas, and then the client terminal can highlight the first segment area, wherein the user's selection operation on the first segment area among the multiple segment areas refers to the user selecting the first segment area from the multiple segment areas, and the first segment area can be any segment area among the multiple segment areas. Highlighting means displaying the multiple lighting areas included in the first segment area in one or more ways such as different lighting parameters, different thicknesses, and different sizes. The user's processing operation on the first segment area may include the user deleting the first segment area, and may also include the user modifying the number of lighting areas in the first segment area, etc. The detailed description of step 1204 can refer to the description of step 104.

1205. The client terminal sends the area information of the first segment area to the lamp.

After the user selects the first segment area, the client terminal may send the area information of the first segment area to the lamp, and the area information may be used by the lamp to control the light-emitting units corresponding to the first segment area to output a second lighting parameter. The second lighting parameter is different from the first lighting parameter. Among them, the area information of the first segment area may be information such as the number and positions of the light-emitting units corresponding to the first segment area.

1206. The lamp controls the light-emitting units corresponding to the first segment area to output the second lighting parameter according to the area information.

After the lamp receives the area information of the first segment area from the client terminal, the lamp may control the light-emitting units corresponding to the first segment area to output the second lighting parameter according to the area information.

1207. The client terminal displays the modified segment area in response to the user's processing operation on the first segment area.

After the user selects the first segment area, the user may perform processing operation on the first segment area. The client terminal can display the modified segment area in response to the user's processing operation. The user's processing operation on the first segment area can include the user deleting the first segment area, and can also include the user modifying the number of lighting areas in the first segment area, etc.

As an embodiment, in the case where the user modifies the number of lighting areas in the first segment area through two sliding controls, the process of, in response to the user's processing operation on the first segment area, displaying the modified segment area can include: in response to the user's modification operation on the first segment area, determining the number of lighting areas included in the modified first segment area; and according to the number of lighting areas, determining the number of modified segment areas and the number of lighting areas included in the modified second segment area, so as to obtain the modified segment area, where the modified second segment area is adjacent to the modified first segment area, and the number of modified segment areas is less than or equal to the number of multiple segment areas.

As an implementation, in the case where the user deletes the first segment area through the delete control, the process of, in response to the user's processing operation on the first segment area, displaying the modified segment area may include: in response to the user's deletion operation on the first segment area, merging the first segment area into a third segment area, where the third segment area is a segment area adjacent to the first segment area; and displaying the modified segment area. The detailed description of step 1207 may refer to the description of step 104.

1208. The client terminal saves the modified segment area in response to the user's save operation on the modified segment area.

After the user modifies the multiple segment areas included in the lamp, the modified segment area can be saved. The client terminal can save the modified segment area in response to the user's save operation. The detailed description of step 1208 can refer to the description of step 105.

1209. The client terminal sends the segmentation information of the modified segment area to the lamp.

After the user modifies the multiple segment areas, the client terminal can send the segmentation information of the modified segment area to the lamp. The segmentation information can be used by the lamp to control the multiple light-emitting units to display the corresponding lighting effect.

1210. The lamp controls the multiple light-emitting units to display the corresponding lighting effect according to the segmentation information.

After receiving the segmentation information sent by the client terminal, the lamp can control the color, brightness, color temperature and other information of the light-emitting units included in the lamp according to the segmentation information, so as to display the corresponding lighting effect.

1211. The client terminal outputs a prompt message to inform the user that the save operation is successful.

After the client terminal successfully saves the modified segment area, a prompt message for prompting the user that the save is successful can be outputted on the segment setting interface. When the client terminal fails to save the modified segment area, a save result of failed saving can also be outputted on the segment setting interface. As shown in FIG. 10, a prompt box for showing prompt information can be displayed on the segment setting interface, where 'F' is a prompt box.

Figure 13:
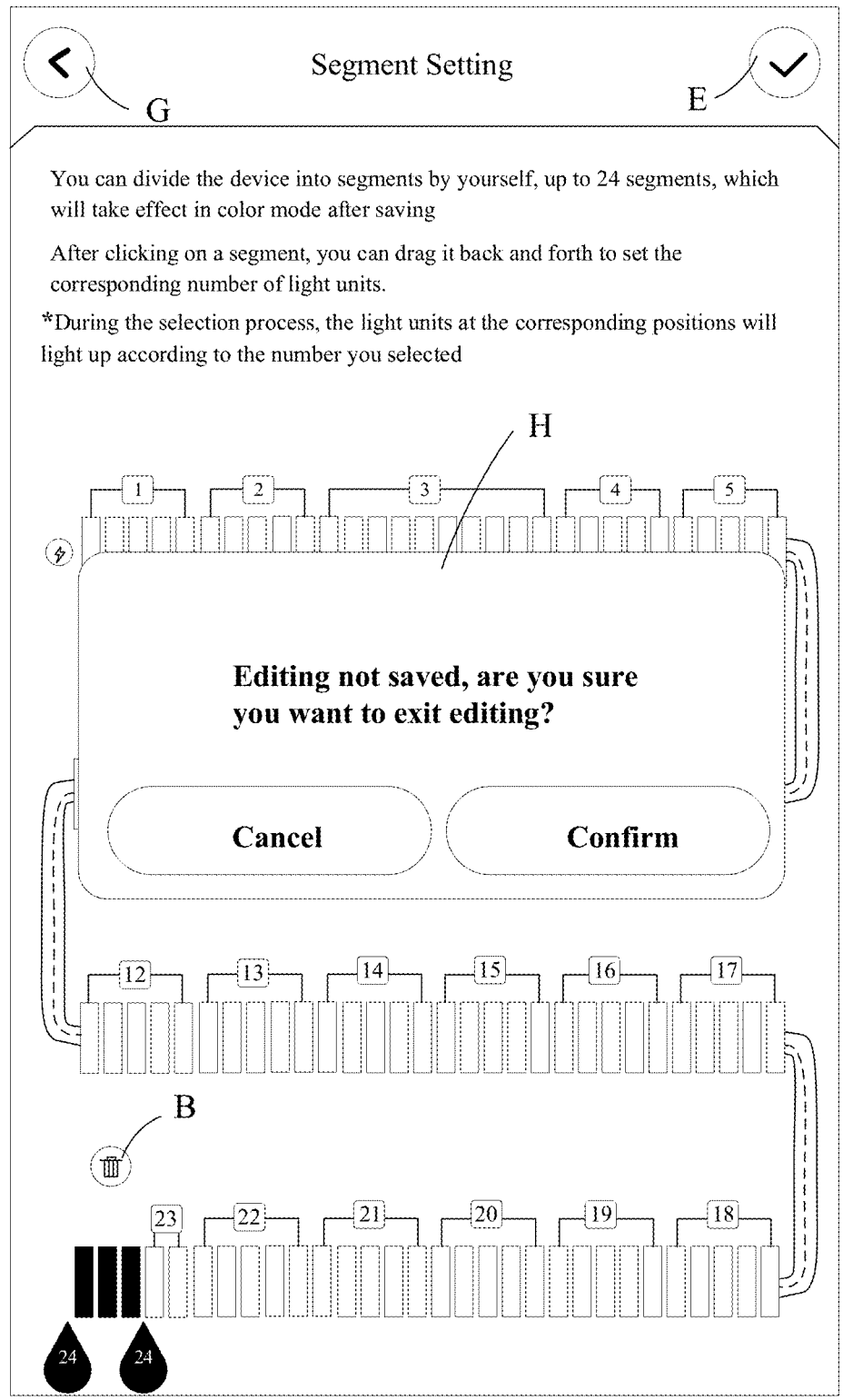
FIG. 13 illustrates a schematic diagram of another interface of a client terminal according to an embodiment of the present disclosure.

FIG. 13 illustrates a schematic diagram of another interface of a client terminal according to an embodiment of the present disclosure. As shown in FIG. 13, the segment setting interface can also include an exit control, where 'G' is an exit control and 'H' is a confirmation box. The user can exit the segment setting interface by manipulating the exit control. After the user operates the exit control, the client terminal can determine whether the user has saved the modified segment area. If the user has not saved it, the client terminal can pop up a confirmation box in the segment setting interface to prompt the user that the modified segment area has not been saved.

Step 1211 can be executed simultaneously with step 1209, or after step 1209.

Accordingly, in embodiments described in FIG. 12, the client terminal can first display the segment setting interface for segment setting, and the client terminal can also send a segment setting instruction to the lamp. After receiving the segment setting instruction, the lamp can control multiple light-emitting units to output the first lighting parameter according to the segment setting instruction. The client terminal can respond to the user's selection operation on the first segment area among the multiple segment areas, highlight the first segment area, and send the area information of the first segment area to the lamp. After receiving the area information, the lamp can control the light-emitting unit corresponding to the first segment area to output the second lighting parameter according to the area information. The client terminal can respond to the user's processing operation on the first segment area and display the modified segment area. The user can also save the modified segment area, the client terminal can respond to the user's save operation, and can send the segmentation information of the modified segment area to the lamp. After receiving the segmentation information, the lamp can control the display of the corresponding lighting effect for each light-emitting unit according to the segmentation information. The client terminal can also output a prompt message for prompting the user that the modified segment area is saved successfully. Accordingly, the user can customize the grouping of the light-emitting units included in the lamp through the client terminal to achieve different lighting effects, thereby improving the flexibility of segmenting the light-emitting units.

Figure 14:
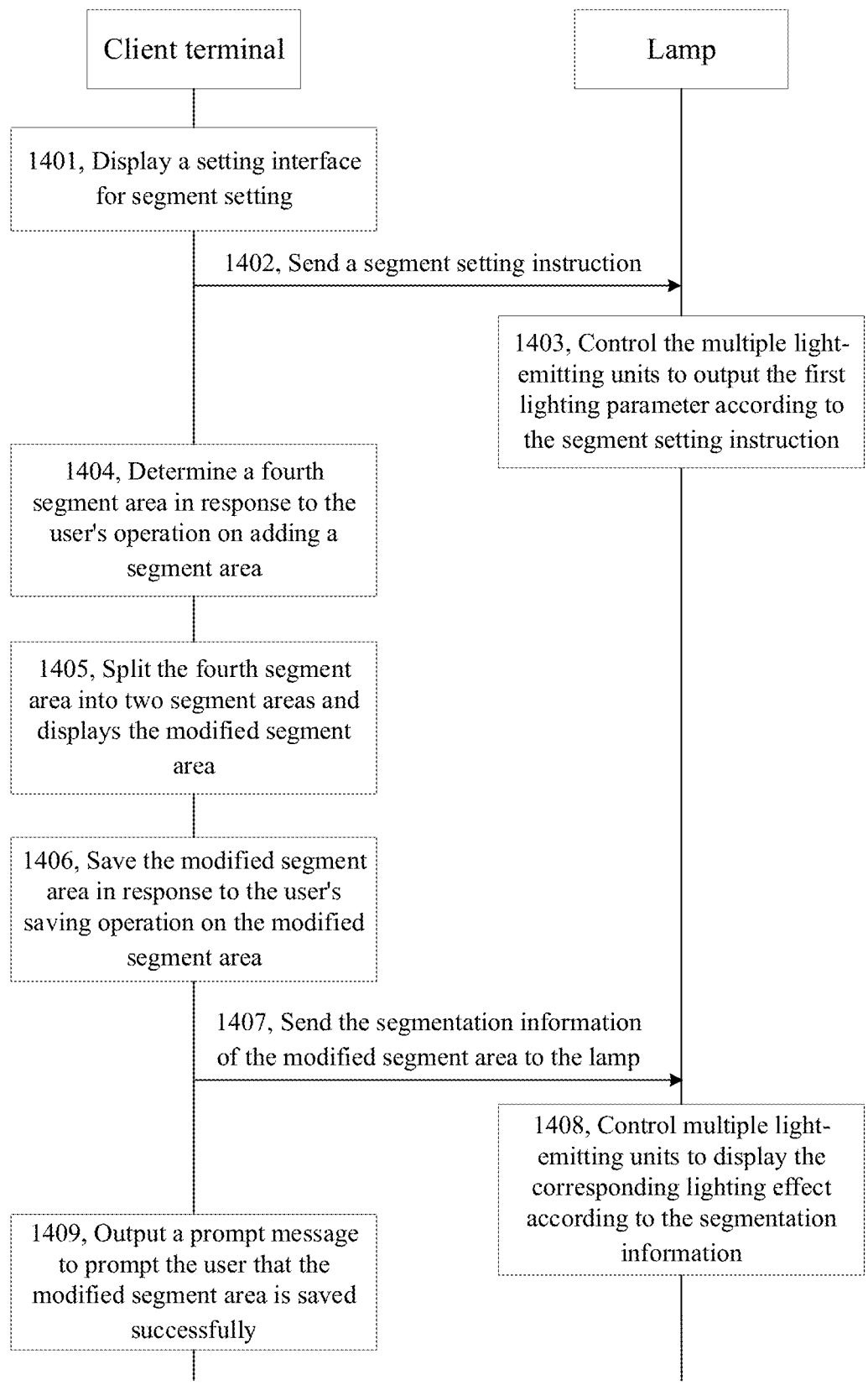
FIG. 14 illustrates a flow chart of another segmentation method according to an embodiment of the present disclosure.

FIG. 14 illustrates a flow chart of another segmentation method according to an embodiment of the present disclosure. As shown in FIG. 14, the segmentation method may include the following steps.

1401. The client terminal displays a setting interface for segment setting.

After the user chooses to segment the lamp, the client terminal can display a setting interface for segmenting the lamp. The setting interface may include multiple segment areas, and the multiple segment areas may include multiple lighting areas, and the multiple lighting areas correspond one-to-one to the multiple light-emitting units included in the lamp. Among them, the segment area represents the individual area obtained after the light-emitting units included in the lamp are segmented, and the lighting area represents the individual light-emitting unit included in each segment area in the lamp. The detailed description of step 1401 can refer to the description of step 101.

1402. The client terminal sends a segment setting instruction to the lamp.

While the client terminal displays the segment setting interface for segment setting, it can also send a segment setting instruction to the lamp, and the segment setting instruction can be used by the lamp to control the multiple light-emitting units to output the first lighting parameter. For example, after the lamp receives the segment setting instruction, the lamp can control multiple light-emitting units to output cold white, control multiple light-emitting units to output warm white, control multiple light-emitting units to output red, and/or control multiple light-emitting units to output other lighting parameters, and the first lighting parameter is not limited here. Step 1402 can be executed synchronously with step 1401.

1403. The lamp controls the multiple light-emitting units to output the first lighting parameter according to the segment setting instruction.

After receiving the segment setting instruction from the client terminal, the lamp can control the multiple light-emitting units to output the first lighting parameter according to the segment setting instruction.

1404. The client terminal determines a fourth segment area in response to the user's operation on adding a segment area.

The segment setting interface may also include an adding control. After the user manipulates the adding control to add a segment area for the lamp, the client terminal may determine a fourth segment area in response to the user's operation on the adding control, where the fourth segment area is a segment area in which the number of lighting areas is greater than or equal to 2. The detailed description of step 1404 may refer to the description of step 104.

1405. The client terminal splits the fourth segment area into two segment areas and displays the modified segment area.

After determining the fourth segment area, the fourth segment area may be split into two segment areas, and the modified segment area may be displayed or highlighted. The detailed description of step 1405 may refer to the description of step 104.

1406. The client terminal saves the modified segment area in response to the user's saving operation on the modified segment area.

After the user modifies multiple segment areas included in the lamp, the modified segment area or areas may be saved. The client terminal may save the modified segment area in response to the user's saving operation. The detailed description of step 1406 may refer to the description of step 105.

1407. The client terminal sends the segmentation information of the modified segment area to the lamp.

After the user modifies the multiple segment areas, the client terminal can send the segmentation information of the modified segment area to the lamp. The segmentation information can be used for the lamp to control the multiple light-emitting units to display corresponding lighting effect.

1408. The lamp controls multiple light-emitting units to display the corresponding lighting effect according to the segmentation information.

After receiving the segmentation information sent by the client terminal, the lamp can control the color, brightness, color temperature and other information of the light-emitting units included in the lamp according to the segmentation information, so as to display the corresponding lighting effect.

1409. The client terminal outputs a prompt message to prompt the user that the modified segment area is saved successfully.

After the client terminal successfully saves the modified segment area, the client terminal can output a prompt message to prompt the user that the modified segment area is saved successfully in the segment setting interface. On the other hand, after the client terminal fails to save the modified segment area, it can also output a save result of failed save in the segment setting interface. The detailed description of step 1409 may refer to the description of step 1211.

Accordingly, in embodiments described in FIG. 14, the client terminal may first display a segmentation interface for segment setting, and the client terminal may also send a segment setting instruction to the lamp. After receiving the segment setting instruction, the lamp may control multiple light-emitting units to output the first lighting parameter according to the segment setting instruction. After responding to the user's operation of adding a segment area, the client terminal may first determine a fourth segment area, split the fourth segment area into two segment areas, and display the modified segment area. Then the user may save the modified segment area. The client terminal may respond to the user's save operation and may send the segmentation information of the modified segment area to the lamp. After receiving the segmentation information, the lamp may control the display of the corresponding lighting effect for each light-emitting unit according to the segmentation information. The client terminal may also output a prompt message for prompting the user that the save is successful. Therefore, the user can customize the grouping of the light-emitting units included in the lamp through the client terminal to achieve different lighting effects, thereby improving the flexibility of segmenting the light-emitting units.

Figure 15:
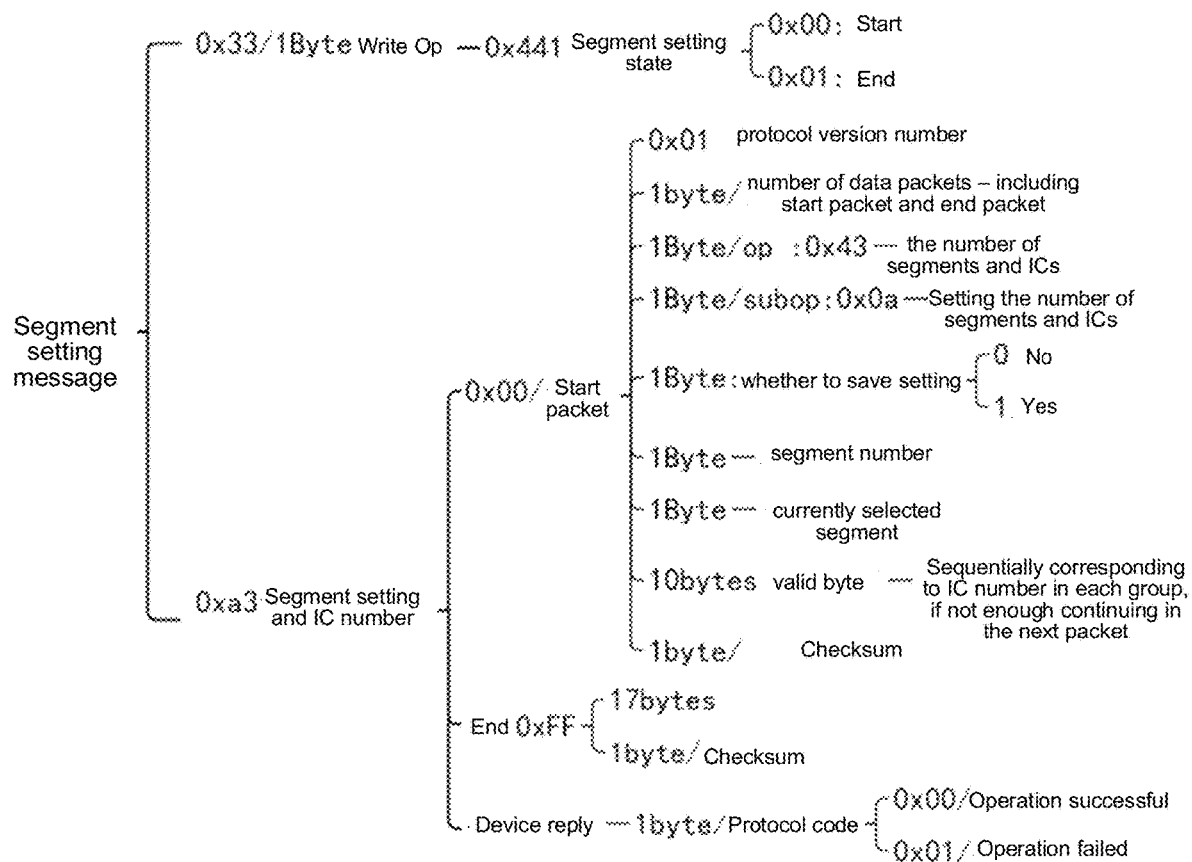
FIG. 15 illustrates a schematic structural diagram of a composition format of segment setting message according to an embodiment of the present disclosure.

FIG. 15 illustrates a structural diagram of the composition format of a segment setting message according to an embodiment of the present disclosure. The segment setting message may be used for communication between the client terminal and the lamp. As shown in FIG. 15, the segment setting message can be the above-mentioned segment setting instruction, the above-mentioned segmentation information, or the above-mentioned segment area information. The lamp can determine the role of the segment setting message according to the bytes included in the segment setting message. Each segment setting message may include 20 bytes. Other number of bytes may also be used.

For example, when the segment setting message is used to indicate the start of segment setting, the segment setting message includes the first byte of 0x33, the second byte of 0x44, the third byte of 0x00, the 4th to 19th bytes are all 0000, and the 20th byte is a check sum used to verify whether the segment setting message is correct or undamaged.

For example, when the segment setting message is used to indicate the segment setting result (i.e., the above segmentation information or the above area information), the segment setting message includes the first byte of 0xa3, the second byte of 0x00, the third byte indicating the protocol version number, the fourth byte indicating the number of data packets, the fifth byte indicating the number of segments (i.e., the number of segment areas) and the number of ICs (i.e., the number of light-emitting units as a light-emitting unit may be implemented by an IC or integrated circuit), the sixth byte indicating the setting information of setting the number of segments and the number of ICs, the seventh byte indicating whether the segment setting result is saved, the eighth byte indicating the current number of segments, the ninth byte indicating the currently selected segment area, the tenth to nineteenth bytes indicating the number of ICs corresponding to each segment area, and the twentieth byte indicating the checksum.

For example, when the segment setting message is used to indicate the end of the segment setting, the segment setting message includes the first byte of 0xa3, the second byte of 0xFF, the third to nineteenth bytes of 0000, and the twentieth byte indicating the checksum.

It should be understood that the same or corresponding information in the above different embodiments can refer to each other.

Figure 16:
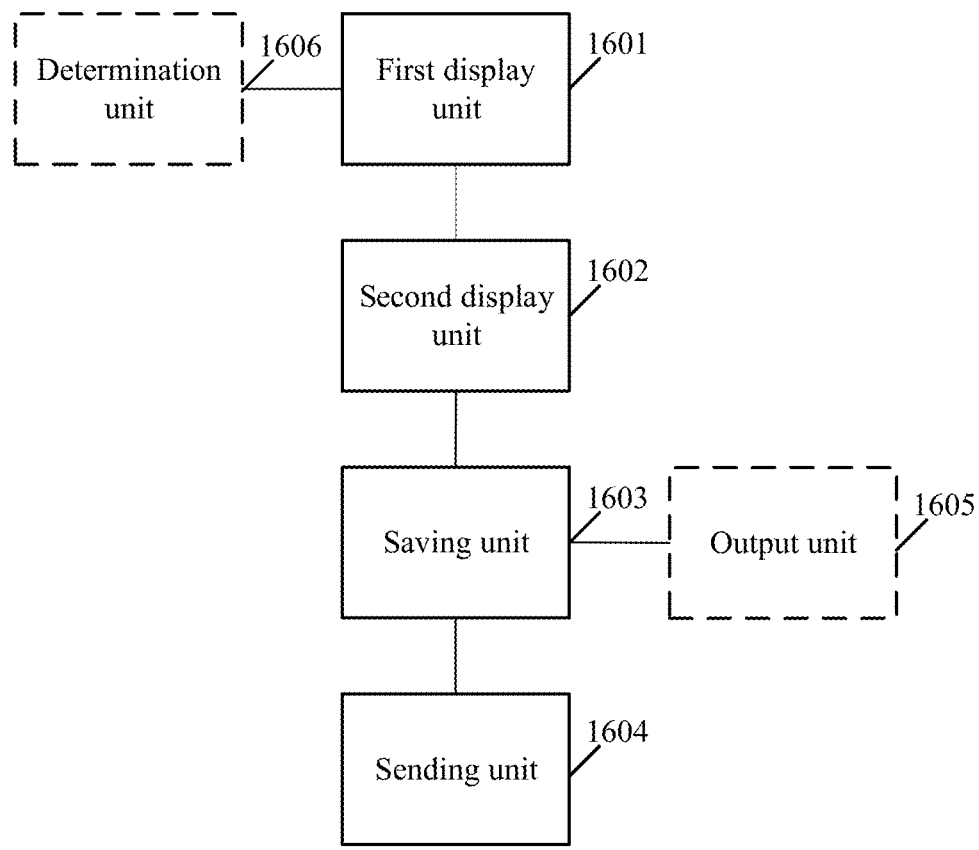
FIG. 16 illustrates a schematic structural diagram of a segmentation device according to an embodiment of the present disclosure.

FIG. 16 illustrates a schematic structural diagram of a segmentation device according to an embodiment of the present disclosure. As shown in FIG. 16, the segmentation device may include: a first display unit 1601, a second display unit 1602, a saving unit 1603, and a sending unit 1604, etc.

The first display unit 1601 may be used to display a setting interface for segment setting, the setting interface includes multiple segment areas, the multiple segment areas include multiple lighting areas, and the multiple lighting areas one-to-one correspond to multiple light-emitting units included in the lamp.

The second display unit 1602 may be used to display the modified segment area in response to the user's modification operation on the multiple segment areas. The saving unit 1603 may be used to save the modified segment area in response to the user's save operation on the modified segment area. The sending unit 1604 may be used to send the segmentation information of the modified segment area to the lamp, and the segmentation information is used by the lamp to control multiple light-emitting units to display corresponding lighting effect.

In some embodiments, the second display unit 1602 may be specifically used for: in response to the user's selection operation on the first segment area among the multiple segment areas, highlighting the first segment area; and in response to the user's processing operation on the first segment area, displaying the modified segment area.

In some embodiments, the second display unit 1602 may be specifically used for: in response to the user's modification operation on the first segment area, determining the number of lighting areas included in the modified first segment area; and according to the number of lighting areas, determining the number of modified segment areas and the number of lighting areas included in the modified second segment area, so as to obtain the modified segment area. The modified second segment area is adjacent to the modified first segment area, and the number of modified segment areas is less than or equal to the number of multiple segment areas.

In some embodiments, the second display unit 1602 may be specifically used for: in response to the user's deletion operation on the first segment area, merging the first segment area into a third segment area, the third segment area being a segment area adjacent to the first segment area; and displaying the modified segment area.

In some embodiments, the setting interface also includes an adding control, and the second display unit 1602 is also used to: in response to the user's operation on the adding control, determine a fourth segment area, the fourth segment area is a segment area with the number of lighting areas greater than or equal to 2; split the fourth segment area into two segment areas; and display the modified segment area.

In some embodiments, the sending unit 1604 is also used to send a segment setting instruction to the lamp, and the segment setting instruction is used by the lamp to control multiple light-emitting units to output the first lighting parameter.

In some embodiments, the sending unit 1604 is also used to send the area information of the first segment area to the lamp in response to the selection operation, and the area information is used by the lamp to control the light-emitting units corresponding to the first segment area to output the second lighting parameter, and the first lighting parameter is different from the second lighting parameter.

In some embodiments, the segmentation device also includes an output unit 1605 which is used to output a prompt message for prompting the user that the setting is saved successfully.

In some embodiments, the segmentation device further includes a determination unit 1606, for determining the number of light-emitting units included in the lamp in response to the user's setting operation for the number of segments. The first display unit 1601 may be used to: display the setting interface for segment setting according to the number of light-emitting units.

Accordingly, in embodiments described in FIG. 16, the client terminal can first display the segmentation interface for segment setting, the segmentation interface can include multiple segment areas, the multiple segment areas include multiple lighting areas, and the multiple lighting areas correspond one-to-one to the multiple light-emitting units included in the lamp. In response to the user's modification operation on the multiple segment areas, the modified segment areas can be displayed, and in response to the user's save operation on the modified segment areas, the modified segment areas can be saved. Finally, the segmentation information of the modified segment area can be sent to the lamp, and the segmentation information is used by the lamp to control the multiple light-emitting units to display the corresponding lighting effect. Therefore, the user can customize the light-emitting units included in the lamp through the client terminal to achieve different lighting effects, thereby improving the flexibility of light-emitting unit segmentation.

Figure 17:
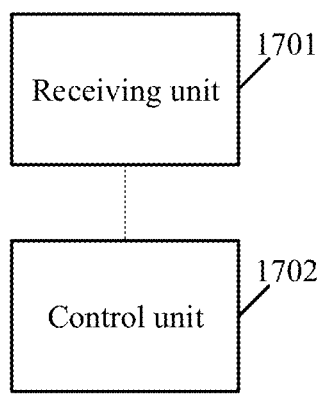
FIG. 17 illustrates a schematic structural diagram of another segmentation device according to an embodiment of the present disclosure.

FIG. 17 illustrates a schematic structural diagram of another segmentation device according to an embodiment of the present disclosure. As shown in FIG. 17, the segmentation device includes a receiving unit 1701 and a control unit 1702, etc.

The receiving unit 1701 may be used to receive a segment setting instruction from a client terminal. The control unit 1702 may be used to control multiple light-emitting units to output a first lighting parameter according to the segment setting instruction.

The receiving unit 1701 may also be used to receive segmentation information of a modified segment area from a client terminal. The control unit 1702 may also be used to control multiple light-emitting units to display the corresponding light effects according to the segmentation information.

In some embodiments, the receiving unit 1701 may also be used to receive area information of a first segment area from the client terminal, and the area information is sent by the client terminal in response to a user's selection operation on the first segment area. The control unit 1702 may also be used to control the light-emitting units corresponding to the first segment area to output a second lighting parameter according to the area information, and the first lighting parameter is different from the second lighting parameter.

Accordingly, in embodiments described in FIG. 17, the lamp can control multiple light-emitting units to output the first lighting parameter according to the segment setting instruction sent by the client terminal, and then control multiple light-emitting units to display the corresponding light effect according to the segmentation information sent by the client terminal, so that the segmentation result can be displayed in real time when the user sets the segmentation of the lamp.

Those skilled in the art can understand that for the convenience and simplicity of description, the specific operation processes of the above-described devices and units can refer to the corresponding processes in the aforementioned method embodiments, and will not be repeated here. In embodiments disclosed in the present disclosure, the coupling between the units can be electrical, mechanical or other forms of coupling. In addition, each functional module in embodiments of the present disclosure can be integrated in a processing unit, or each unit can exist physically separately, or two or more units can be integrated in one unit. The above-mentioned integrated unit can be implemented in the form of hardware or in the form of software functional modules.

Figure 18:
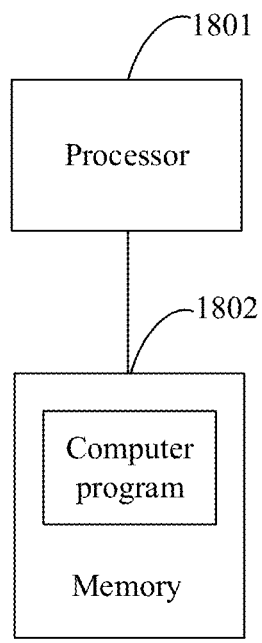
FIG. 18 illustrates a schematic structural diagram of an electronic device according to an embodiment of the present disclosure.

FIG. 18 illustrates a structural schematic diagram of an electronic device according to an embodiment of the present disclosure. As shown in FIG. 18, the electronic device may include a processor 1801 and a memory 1802, etc. The memory 1802 stores a computer program in the form of computer instructions. When the computer program (computer instructions) is executed by the processor 1801, the various processes disclosed in the above-mentioned embodiments can be implemented. It can be understood by those skilled in the art that the structure of the electronic device shown does not constitute a limitation on the electronic device, and may include more or fewer components than shown, or combine certain components, or arrange components differently.

Processor 1801 may include one or more processing cores. The processor 1801 uses various interfaces and buses to connect various parts of the entire electronic device, and executes various functions of the electronic device and processes data by running or executing instructions, programs, code sets or instruction sets stored in the memory 1802, and calling data stored in the memory 1802. Optionally, the processor 1801 may be implemented in at least one hardware form of digital signal processing (DSP), field-programmable gate array (FPGA), and programmable logic array (PLA). The processor 1801 may integrate one or a combination of a central processing unit (CPU), a graphics processor (GPU), a modem, etc. Among them, the CPU mainly handles the operating system, user interface, and applications; the GPU is responsible for rendering and drawing the display content; and the modem is used to handle wireless communications. It can be understood that the above-mentioned modem may not be integrated into the processor 1801 and may be implemented solely through a communication chip.

The memory 1802 may include random access memory (RAM) or read-only memory (Read-Only Memory). Memory 1802 may be used to store instructions, programs, codes, sets of codes, or sets of instructions. The memory 1802 may include a program storage area and a data storage area, where the program storage area may store instructions for implementing an operating system, instructions for implementing at least one function, instructions for implementing various method embodiments described and the like. The storage data area can also store data created by the electronic device during use.

Although not shown, the electronic device may also include a display unit, etc., which will not be repeated here. Specifically, in one embodiment, the processor 1801 in the electronic device may load the executable files corresponding to the processes of one or more application programs into the memory 1802 according to user instructions, and the processor 1801 may execute the application programs stored in the memory 1802, thereby implementing the various processes according to the above embodiments.

The electronic device can be a device installed with the above client terminal, or installed with the above lamp. For detailed descriptions, reference can be made to the relevant description in the above embodiments.

Figure 19:
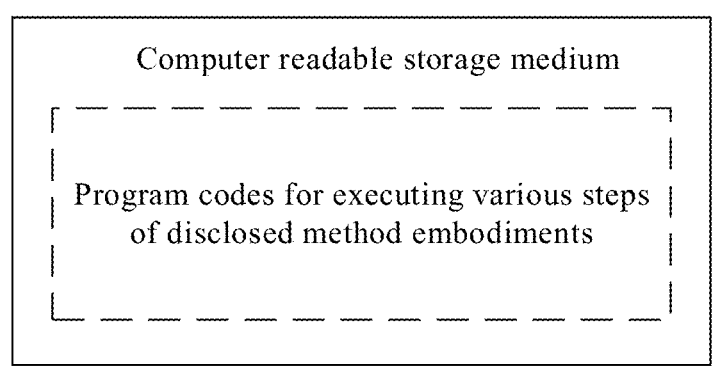
FIG. 19 illustrates a schematic structural diagram of a computer-readable storage medium according to an embodiment of the present disclosure.

FIG. 19 illustrates a computer-readable storage medium according to an embodiment of the present disclosure. As shown in FIG. 19, the computer-readable storage medium may store a computer program, and the computer program can be executed by one or more processors to execute the processes described in the above embodiments.

The computer-readable storage medium can be an electronic memory such as a flash memory, an EEPROM (electrically erasable programmable read-only memory), an EPROM, a hard disk or a ROM. Optionally, the computer-readable storage medium may include a non-volatile computer-readable storage medium (or non-transitory computer-readable storage medium). The computer-readable storage medium has a storage space for program codes for executing any processes in the above embodiments. These program codes can be read from or written into one or more computer program products. The program code may be compressed, for example, in an appropriate form.

According to one aspect of the present disclosure, a computer program product or computer program is disclosed, the computer program product or computer program including computer instructions, the computer instructions being stored in a computer-readable storage medium. The processor of the electronic device reads the computer instructions from the computer-readable storage medium, and the processor executes the computer instructions, so that the electronic device executes the processes according to the various disclosed embodiments.

The above only illustrates the present disclosure, and does not limit the present disclosure in any form. Any person skilled in the art can make changes or modifications to equivalent embodiments of equivalent changes using the above disclosed technical content without departing from the scope of the technical solution of the present disclosure. However, such modification, equivalent change and modification made to the above embodiments based on the technical essence of the present disclosure without departing from the content of the technical solution of the present disclosure still falls within the scope of the technical solution of the present disclosure.

What is claimed is:

1. A segmentation method, comprising:
    displaying a setting interface for segment setting, the setting interface including a plurality of segment areas, the plurality of segment areas including a plurality of lighting areas, and the plurality of lighting areas one-to-one corresponding to a plurality of light-emitting units included in a lamp such that the plurality of light-emitting units are segmented into a plurality of segments of the lamp which is virtually represented by the plurality of segment areas one-to-one, each segment area is marked by a sequential segment area number;
    in response to a modification operation by a user on the plurality of segment areas, displaying a modified segment area, the modification operation being an operation by the user to modify the number of the plurality of segment areas and/or the number of lighting areas included in a segment area, and a lighting-emitting unit in each of the plurality of segments corresponding to the plurality of segment areas being controlled to display a color to indicate setting of the plurality of segment areas;
    in response to a save operation by the user on the modified segment area, saving the modified segment area; and
    sending segmentation information of the modified segment area to the lamp, the segmentation information being used by the lamp to control the plurality of light-emitting units to display corresponding lighting effect,
    wherein, in response to the modification operation by the user on the plurality of segment areas, displaying a modified segment area further includes:
    in response to a selection operation by the user on a first segment area among the plurality of segment areas, highlighting the first segment area;
    in response to a processing operation by the user on the first segment area, displaying the modified segment area;
    in response to a deletion operation by the user on the first segment area, merging the first segment area into a third segment area, the third segment area being a segment area adjacent to the first segment area, and adjusting sequential segment area numbers of the plurality of segment areas; and
    displaying the modified segment area.

2. The method according to claim 1, wherein, in response to the processing operation by the user on the first segment area, displaying the modified segment area further includes:
    in response to a modification operation by the user on the first segment area, determining the number of lighting areas and a second segment area included in a modified first segment area, the second segment area being adjacent to the modified first segment area; and
    according to the number of lighting areas, determining the number of modified segment areas and the number of lighting areas included in a modified second segment area, so as to obtain the modified segment area, the number of modified segment areas being less than or equal to the number of the plurality of segment areas.

3. The method according to claim 1, wherein the setting interface further includes an adding control, and the displaying the modified segment area in response to the modification operation by the user on the multiple segment areas further includes:
    in response to a operation by the user on the adding control, determining a fourth segment area, the fourth segment area being a segment area with the number of lighting areas greater than or equal to 2;
    splitting the fourth segment area into two segment areas; and
    displaying the modified segment area.

4. The method according to claim 1, wherein in the operation of displaying the setting interface for segment setting, the method further includes:

sending a segment setting instruction to the lamp, the segment setting instruction being used by the lamp to control the multiple light-emitting units to output a first lighting parameter.

5. The method according to claim 4, wherein the method further comprises:

in response to the selection operation by the user, sending area information of the first segment area to the lamp, the area information being used by the lamp to control light-emitting units corresponding to the first segment area to output a second lighting parameter, wherein the first lighting parameter is different from the second lighting parameter.

6. The method according to claim 1, wherein the method further comprises:

outputting a prompt message for prompting the user that the modified segment area is saved successfully.

7. The method according to claim 1, wherein the method further comprises:

determining the number of light-emitting units included in the lamp in response to the setting operation by the user for segment number and whether the light-emitting units included in the lamp are cropped by the user, wherein the displaying a setting interface for segment setting further includes:

displaying the setting interface for segment setting according to the number of light-emitting units.

8. A non-transitory computer-readable storage medium, wherein the computer-readable storage medium stores a computer program which, when executed by a processor, is configured for implementing a segmentation method, the method comprising:

displaying a setting interface for segment setting, the setting interface including a plurality of segment areas, the plurality of segment areas including a plurality of lighting areas, and the plurality of lighting areas one-to-one corresponding to a plurality of light-emitting units included in a lamp such that the plurality of light-emitting units are segmented into a plurality of segments of the lamp which is virtually represented by the plurality of segment areas one-to-one, each segment area is marked by a sequential segment area number;

in response to a modification operation by a user on the plurality of segment areas, displaying a modified segment area, the modification operation being an operation by the user to modify the number of the plurality of segment areas and/or the number of lighting areas included in a segment area, and a lighting-emitting unit in each of the plurality of segments corresponding to the plurality of segment areas being controlled to display a color to indicate setting of the plurality of segment areas;

in response to a save operation by the user on the modified segment area, saving the modified segment area; and sending segmentation information of the modified segment area to the lamp, the segmentation information being used by the lamp to control the plurality of light-emitting units to display corresponding lighting effect, wherein, in response to the modification operation by the user on the plurality of segment areas, displaying a modified segment area further includes:

in response to a selection operation by the user on a first segment area among the plurality of segment areas, highlighting the first segment area;

in response to a processing operation by the user on the first segment area, displaying the modified segment area;

in response to a deletion operation by the user on the first segment area, merging the first segment area into a third segment area, the third segment area being a segment area adjacent to the first segment area, and adjusting sequential segment area numbers of the plurality of segment areas; and displaying the modified segment area.

9. The non-transitory computer-readable storage medium according to 8, wherein, in response to the processing operation by the user on the first segment area, displaying the modified segment area further includes:

in response to a modification operation by the user on the first segment area, determining the number of lighting areas and a second segment area included in a modified first segment area, the second segment area being adjacent to the modified first segment area; and according to the number of lighting areas, determining a number of modified segment areas and the number of lighting areas included in a modified second segment area, so as to obtaining the modified segment area, the number of modified segment areas being less than or equal to the number of the plurality of segment areas.

10. The non-transitory computer-readable storage medium according to claim 8, wherein the setting interface further includes an adding control, and the displaying the modified segment area in response to the modification operation by the user on the multiple segment areas further includes:

in response to a operation by the user on the adding control, determining a fourth segment area, the fourth segment area being a segment area with the number of lighting areas greater than or equal to 2;

splitting the fourth segment area into two segment areas; and displaying the modified segment area.

11. The non-transitory computer-readable storage medium according to claim 8, wherein in the operation of displaying the setting interface for segment setting, the method further includes:

sending a segment setting instruction to the lamp, the segment setting instruction being used by the lamp to control the multiple light-emitting units to output a first lighting parameter.

12. The non-transitory computer-readable storage medium according to claim 11, wherein the method further comprises:

in response to the selection operation by the user, sending area information of the first segment area to the lamp, the area information being used by the lamp to control light-emitting units corresponding to the first segment area to output a second lighting parameter, wherein the first lighting parameter is different from the second lighting parameter.

13. The non-transitory computer-readable storage medium according to claim 8, wherein the method further comprises:

outputting a prompt message for prompting the user that the modified segment area is saved successfully.

14. The non-transitory computer-readable storage medium according to claim 8, wherein the method further comprises:

determining a number of light-emitting units included in the lamp in response to the setting operation by the user for segment number and whether the light-emitting units included in the lamp are cropped by the user,
wherein the displaying a setting interface for segment setting further includes:
displaying the setting interface for segment setting according to the number of light-emitting units.

* * * * *